(12) United States Patent
Shibao et al.

(10) Patent No.: US 11,377,744 B2
(45) Date of Patent: Jul. 5, 2022

(54) ORGANIC RESIN-COATED PLATED STEEL SHEET

(71) Applicant: NIPPON STEEL CORPORATION, Tokyo (JP)

(72) Inventors: Fumio Shibao, Tokyo (JP); Masayoshi Nagatomi, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 523 days.

(21) Appl. No.: 16/491,530

(22) PCT Filed: Mar. 9, 2018

(86) PCT No.: PCT/JP2018/009347
§ 371 (c)(1),
(2) Date: Sep. 5, 2019

(87) PCT Pub. No.: WO2018/164276
PCT Pub. Date: Sep. 13, 2018

(65) Prior Publication Data
US 2020/0032399 A1    Jan. 30, 2020

(30) Foreign Application Priority Data
Mar. 10, 2017  (JP) .............................. JP2017-046287

(51) Int. Cl.
*C23C 28/00*  (2006.01)
*C23C 22/05*  (2006.01)
(Continued)

(52) U.S. Cl.
CPC .............. *C23C 28/32* (2013.01); *B32B 15/09* (2013.01); *B32B 27/20* (2013.01); *B32B 27/36* (2013.01); *C23C 22/05* (2013.01); *C25D 3/22* (2013.01)

(58) Field of Classification Search
None
See application file for complete search history.

(56) References Cited

U.S. PATENT DOCUMENTS

2007/0128431 A1    6/2007   Ozawa et al.

FOREIGN PATENT DOCUMENTS

| EP | 0558837 B1 | 8/1996 |
|----|------------|--------|
| JP | 53-9238    | 1/1978 |

(Continued)

OTHER PUBLICATIONS

Indian Office Action for counterpart Indian Application No. 201917035937, dated May 13, 2020, with English translation.

(Continued)

*Primary Examiner* — Kevin R Kruer
(74) *Attorney, Agent, or Firm* — Birch, Stewart, Kolasch & Birch, LLP

(57) ABSTRACT

The present invention provides a noble and improved organic resin-coated plated steel sheet which is improved in degreasing properties while securing the characteristics required for the organic resin-coated plated steel sheet. In order to solve the problems, according to one aspect of the present invention, there is provided an organic resin-coated plated steel sheet comprising: a metal coated steel sheet; an organic resin coating covering the metal coated steel sheet; and beads dispersed in the organic resin coating, in which the organic resin coating includes a polyester having a glass transition temperature of 0° C. to 20° C., and a melamine-formaldehyde, the beads are urethane beads having a glass transition temperature of −60° C. to 50° C., are contained in the organic resin coating at a ratio of 1 to 15 mass % to the total mass of the organic resin coating, and are dispersed in (Continued)

the organic resin coating at an area density of 5 to 1000 pieces/mm$^2$, and relationships of Formulas (1) to (3) are satisfied.

6 Claims, 5 Drawing Sheets

(51) Int. Cl.
*C25D 3/22* (2006.01)
*B32B 15/09* (2006.01)
*B32B 27/36* (2006.01)
*B32B 27/20* (2006.01)

(56) References Cited

FOREIGN PATENT DOCUMENTS

| | | |
|---|---|---|
| JP | 9-241576 A | 9/1997 |
| JP | 9-267428 A | 10/1997 |
| JP | 10-34078 A | 2/1998 |
| JP | 2001-89868 A | 4/2001 |
| JP | 2001-214182 A | 8/2001 |
| JP | 2001-316845 A | 11/2001 |
| JP | 2002-38280 A | 2/2002 |
| JP | 2002-60959 A | 2/2002 |
| JP | 2002-266081 A | 9/2002 |
| JP | 2003-253464 A | 9/2003 |
| JP | 2007-167836 A | 7/2007 |
| JP | 2008-94085 A | 4/2008 |
| JP | 2008-161735 A | 7/2008 |
| JP | 2011-230425 A | 11/2011 |
| JP | 2013-67159 A | 4/2013 |
| JP | 5644983 B1 | 12/2014 |
| JP | 2017-61750 A | 3/2017 |
| WO | WO 2014/112544 A1 | 7/2014 |

OTHER PUBLICATIONS

"Method of Erichsen cupping test", JIS Z 2247, (2006), total of 21 pages.
"Methods of salt spray testing", JIS Z 2371, (2000), total of 86 pages.
International Search Report for PCT/JP2018/009347 (PCT/ISA/210) dated May 22, 2018.
Notice of Allowance issued in JP Application No. 2018-530924 dated Aug. 14, 2018.
Office Action issued in TW Application No. 107108176 dated Oct. 12, 2018.
Written Opinion of the International Searching Authority for PCT/JP2018/009347 (PCT/ISA/237) dated May 22, 2018.

ORGANIC RESIN-COATED PLATED STEEL SHEET

TECHNICAL FIELD OF THE INVENTION

The present invention relates to an organic resin-coated plated steel sheet.

RELATED ART

For home appliances, building materials, vehicles, and the like, an organic resin-coated plated steel sheet (precoated steel sheet) in which the surface layer of a zinc based-metal coated steel sheet is covered with an organic resin coating has been used instead of post-coated products coated after forming in the related art. After being subjected to press working, the organic resin-coated plated steel sheet is often used as a material for home appliances, building materials, vehicles, and the like without being subjected to further coating or the like. Therefore, such an organic resin-coated plated steel sheet is required to be excellent in defect resistance so as not to lose its beauty during working.

For example, Patent Document 1 discloses an organic resin-coated plated steel sheet which contains beads in an organic coating and resists coating damage due to press working, that is, has excellent defect resistance by specifying the particle size and glass transition temperature of the beads.

In addition, Patent Document 2 discloses an organic resin-coated plated steel sheet for a drive case such as an optical disc, which is excellent in a property of preventing damage to the optical disc and has conductivity. Specifically, in Patent Document 2, the conductivity is secured by limiting the film thickness of the resin coating, and the defect resistance is secured by including beads in the organic resin coating.

Patent Document 3 also discloses an organic resin-coated plated steel sheet containing beads as an organic resin-coated plated steel sheet which is improved in a property of preventing damage to an optical disc. In Patent Document 3, the defect resistance is improved by specifying the average particle size and added amount of the beads, the kind and glass transition temperature of a resin, and the like.

PRIOR ART DOCUMENT

Patent Document

[Patent Document 1] Japanese Patent No. 5644983
[Patent Document 2] Japanese Unexamined Patent Application, First Publication No. 2008-94085
[Patent Document 3] Japanese Unexamined Patent Application, First Publication No. 2008-161735

DISCLOSURE OF THE INVENTION

Problems to be Solved by the Invention

In order to perform press working on an organic resin-coated plated steel sheet, first, a pressing oil is applied to the surface of the organic resin-coated plated steel sheet. Next, the press working is performed. Here, since convex-concave portions are formed by beads on the surface of the organic resin-coated plated steel sheet, defects are not easily generated on the surface of the organic resin-coated plated steel sheet during the press working. Furthermore, the pressing oil is likely to be held on the surface of the organic resin-coated plated steel sheet by these convex-concave portions. Therefore, the organic resin-coated plated steel sheet is also excellent in workability. Then, the surface of the organic resin-coated plated steel sheet is treated with a degreasing agent. Accordingly, the pressing oil is removed from the surface of the organic resin-coated plated steel sheet. Here, when the degreasing agent remains on the surface of the organic resin-coated plated steel sheet, problems such as impairing the beauty of the surface of the organic resin-coated plated steel sheet occur. Therefore, after the treatment with the degreasing agent, the degreasing agent is removed from the surface of the organic resin-coated plated steel sheet by washing with water.

However, since the convex-concave portions due to the beads are formed on the surface of the organic resin-coated plated steel sheet, there is a problem that the degreasing agent tends to remain in the convex-concave portions even after washing with water. In addition, in a case where the degreasing agent remains in the convex-concave portions, a degreasing agent mark is formed on the surface of the organic resin-coated plated steel sheet. Such a degreasing agent mark causes color unevenness on the surface of the organic resin-coated plated steel sheet, and thus impairs the beauty of the organic resin-coated plated steel sheet. Therefore, an organic resin-coated plated steel sheet which is less likely to generate degreasing agent marks, that is, excellent in degreasing properties has been strongly desired. On the other hand, the organic resin-coated plated steel sheet also requires the above-mentioned characteristics such as the defect resistance.

The present invention has been made in view of the above problems, and an object of the present invention is to provide a noble and improved organic resin-coated plated steel sheet which is improved in degreasing properties while securing the characteristics required for the organic resin-coated plated steel sheet at low costs.

Means for Solving the Problems

In order to solve the problems, according to an aspect of the present invention, there is provided an organic resin-coated plated steel sheet comprising: a metal coated steel sheet; an organic resin coating covering the metal coated steel sheet; and beads dispersed in the organic resin coating, in which the organic resin coating includes a polyester having a glass transition temperature of 0° C. to 20° C., and a melamine-formaldehyde, the beads are urethane beads having a glass transition temperature of −60° C. to 50° C., are contained in the organic resin coating at a ratio of 1 to 15 mass % to the total mass of the organic resin coating, and are dispersed in the organic resin coating at an area density of 5 to 1000 pieces/mm², and assuming that an average film thickness of a part where the beads are not present in the organic resin coating is T (μm), an average particle size of the beads is φ (μm), an average film thickness of parts of bead coating covering the beads in the organic resin coating is t (μm), the glass transition temperature of the polyester is Tgp (° C.), and the glass transition temperature of the beads is Tgb (° C.), relationships of Formulas (1) to (3) are satisfied.

$$5 \leq T \leq 15 \ \mu m \tag{1}$$

$$1.1 \leq \varphi/T \leq 10 \tag{2}$$

$$13 \leq (\varphi/t) \times \{(Tgb+273)/(Tgp+273)\} \leq 140 \tag{3}$$

According to another aspect of the present invention, there is provided an organic resin-coated plated steel sheet comprising: a metal coated steel sheet; an organic resin coating covering the metal coated steel sheet; and beads dispersed in the organic resin coating, in which the organic resin coating includes a polyester and a melamine-formaldehyde, a glass transition temperature of the organic resin coating is 0° C. to 35° C., the beads are urethane beads having a glass transition temperature of −60° C. to 50° C., are contained in the organic resin coating at a ratio of 1 to 15 mass % to the total mass of the organic resin coating, and are dispersed in the organic resin coating at an area density of 5 to 1000 pieces/mm$^2$, and assuming that an average film thickness of a part where the beads are not present in the organic resin coating is T (μm), the average particle size of the beads is φ (μm), an average film thickness of parts of bead coating covering the beads in the organic resin coating is t (μm), the glass transition temperature of the organic resin coating is Tgf (° C.), and the glass transition temperature of the beads is Tgb (° C.), relationships of Formulas (1) to (3') are satisfied.

$$5 \leq T \leq 15 \ \mu m \quad (1)$$

$$1.1 \leq \varphi/T \leq 10 \quad (2)$$

$$10 \leq (\varphi/t) \times \{(Tgb+273)/(Tgf+273)\} \leq 115 \quad (3')$$

Here, the average film thickness of the parts of bead coating covering the beads in the organic resin coating may be 0.3 to 1.0 μm.

In addition, a chemical treatment layer formed between the metal coated steel sheet and the organic resin coating may be further included.

In addition, the organic resin coating may further include at least one of 3 to 15 mass % of carbon black, 1 to 10 mass % of calcium-modified silica, and 0.5 to 5 mass % of an epoxy resin.

The metal coated steel sheet may be a zinc based-metal coated steel sheet.

Effects of the Invention

As described above, according to the present invention, when the organic resin-coated plated steel sheet is subjected to press working, the surface of the organic resin coating is flattened by distortion of the beads. Therefore, a degreasing agent can be applied to the flattened surface of the organic resin coating. In addition, until the surface of the organic resin coating is flattened, convex-concave portions remain on the surface of the organic resin coating, so that defect resistance is maintained during the press working. Furthermore, since a pressing oil remains in the convex-concave portions, press formability is also improved. The organic resin coating maintains flatness even when removing the degreasing agent, so that the degreasing agent can be removed more reliably. That is, degreasing properties are improved. Thereafter, the beads are recovered, so that characteristics such as defect resistance are also secured in a subsequent step (for example, an assembly step) using the organic resin-coated plated steel sheet. In addition, the above-described effects can be obtained even if the organic resin coating is made thin, so that the above-described effects can be obtained at low costs.

EMBODIMENTS OF THE INVENTION

Figure 1:
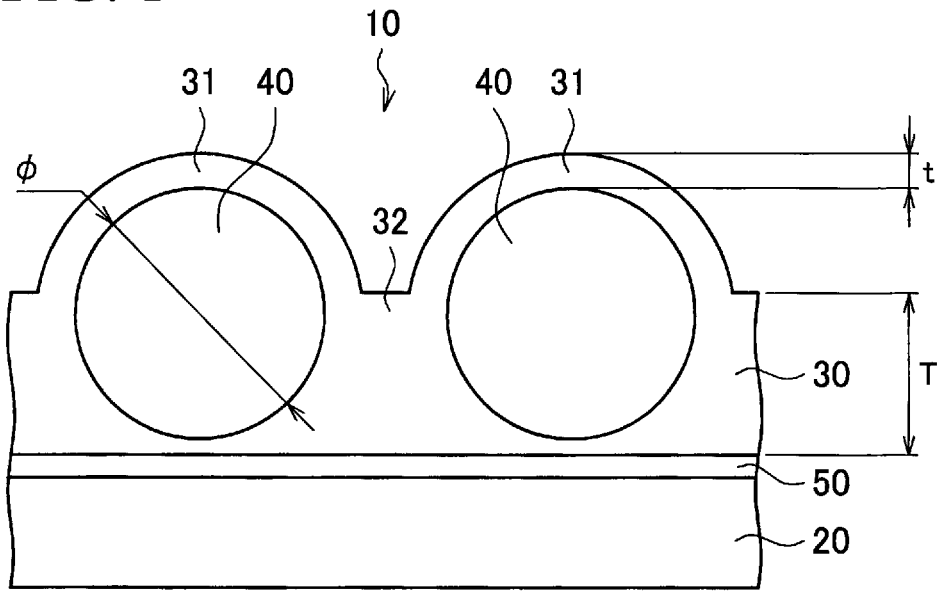
FIG. 1 is a cross-sectional view showing the configuration of an organic resin-coated plated steel sheet according to an embodiment of the present invention.

Hereinafter, preferred embodiments of the present invention will be described in detail with reference to the accompanying drawings. In the present specification and the drawings, like elements having substantially the same functional configuration are denoted by like reference numerals, and overlapping descriptions will be omitted.

<1. Outline of Organic Resin-Coated Plated Steel Sheet>

First, an outline of an organic resin-coated plated steel sheet 10 according to the present embodiment will be described based on FIG. 1. The organic resin-coated plated steel sheet 10 includes a metal coated steel sheet 20, an organic resin coating 30, beads 40, and a chemical treatment layer 50. The beads 40 are dispersed in the organic resin coating 30 and form convex-concave portions on the surface of the organic resin coating 30.

In the present embodiment, when the organic resin-coated plated steel sheet 10 is subjected to press working, the surface of the organic resin coating 30 is flattened by distortion of the beads 40. Therefore, a degreasing agent can be applied to the flattened surface of the organic resin coating 30. The organic resin coating 30 maintains flatness even when removing the degreasing agent, so that the degreasing agent can be removed more reliably. That is, the degreasing properties are improved. Thereafter, the beads 40 are recovered, so that defect resistance and the like are also secured.

<2. Behavior of Organic Resin Coating>

Next, the behavior of the organic resin coating 30 according to the present embodiment at the time of press working will be described in comparison to the behavior of an organic resin coating in the related art.

Figure 6:
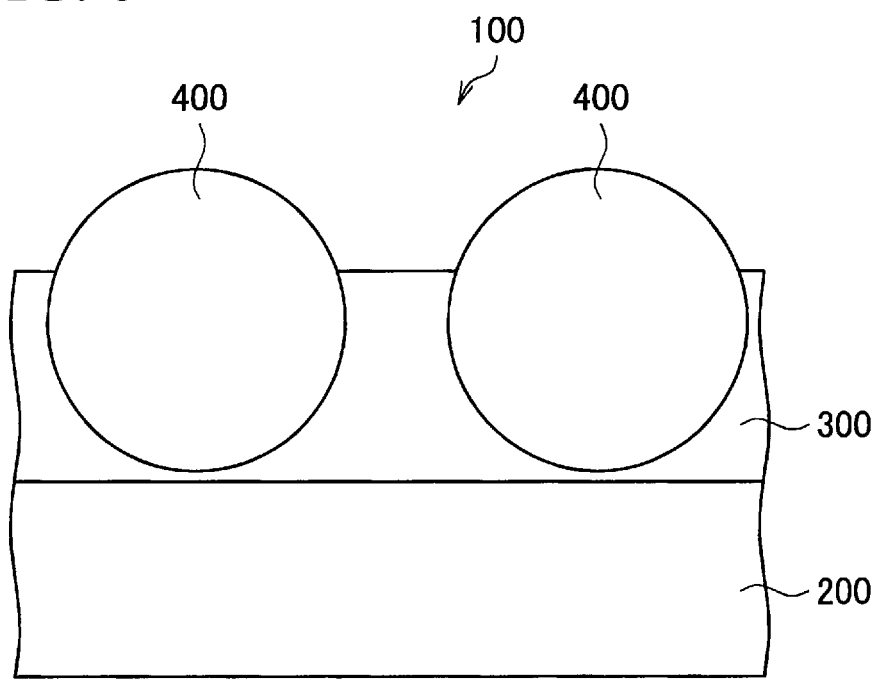
FIG. 6 is a cross-sectional view showing the behavior of an organic resin coating in the related art during press working.

First, the behavior of an organic resin coating 300 in the related art will be described based on FIGS. 6 to 10. FIG. 6 shows the configuration of an organic resin-coated plated steel sheet 100 in the related art. The organic resin-coated plated steel sheet 100 includes a metal coated steel sheet 200, an organic resin coating 300, and beads 400. There are cases where a chemical treatment layer is formed between the organic resin coating 300 and the metal coated steel sheet 200, but illustration thereof is omitted here. The beads 400 are dispersed in the organic resin coating 300 and form convex-concave portions on the surface of the organic resin coating 300.

Figure 7:
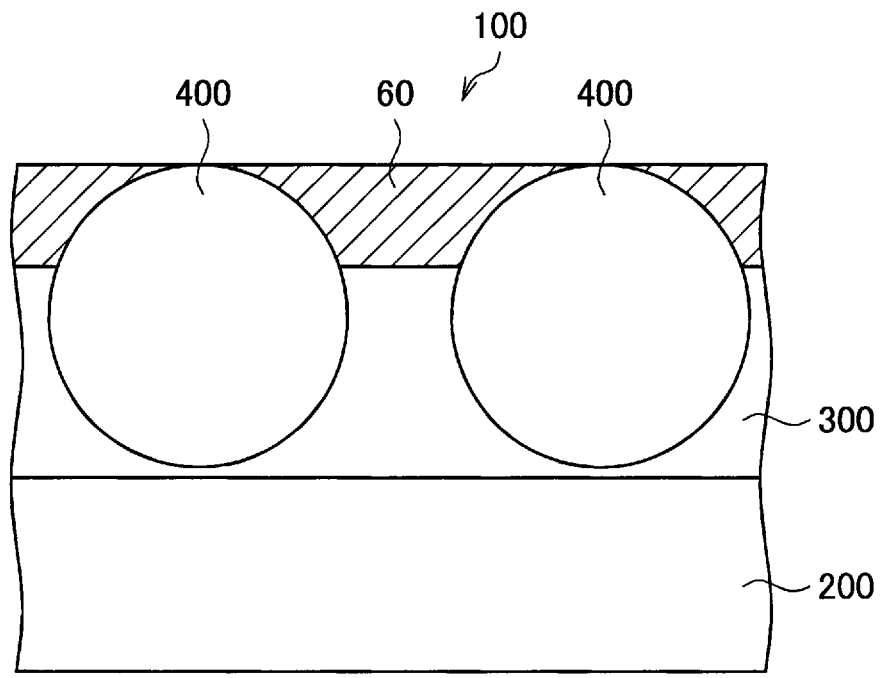
FIG. 7 is a cross-sectional view showing the behavior of the organic resin coating in the related art during press working.
Figure 8:
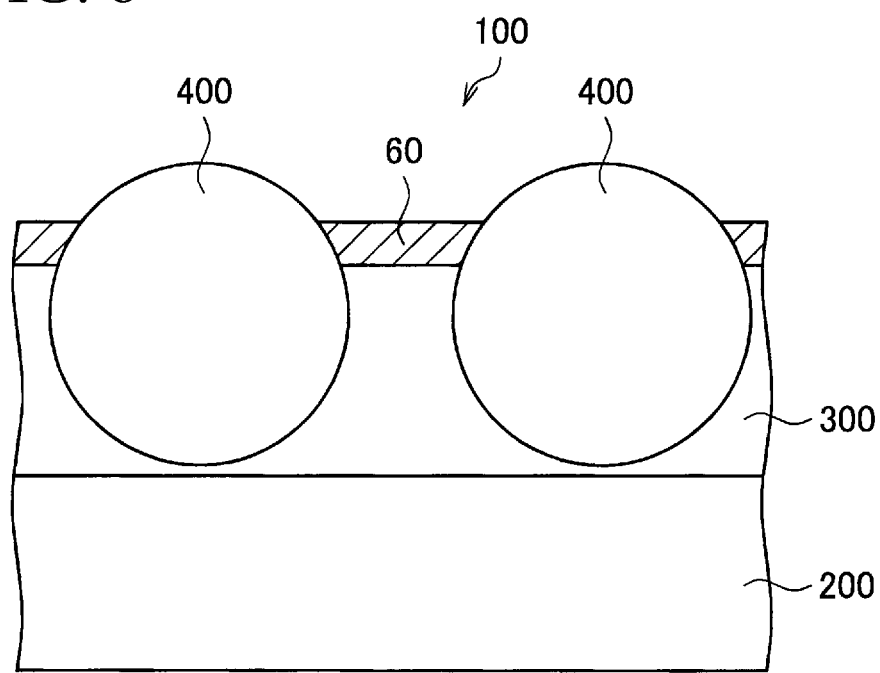
FIG. 8 is a cross-sectional view showing the behavior of the organic resin coating in the related art during press working.

First, as shown in FIG. 7, a pressing oil 60 is applied to the surface of the organic resin coating 300. Thereafter, press working is performed. Since the beads 400 hardly deform during the press working, the convex-concave portions due to the beads 400 are still formed on the surface of the organic resin coating 300. Therefore, as shown in FIG. 8, after the press working, the pressing oil 60 remains in the convex-concave portions.

Figure 9:
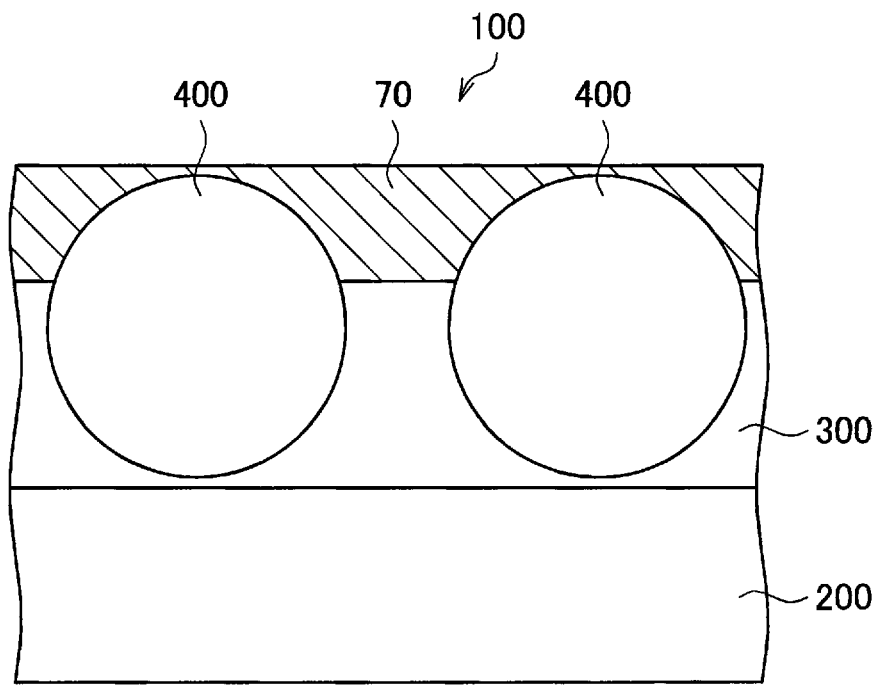
FIG. 9 is a cross-sectional view showing the behavior of the organic resin coating in the related art during press working.
Figure 10:
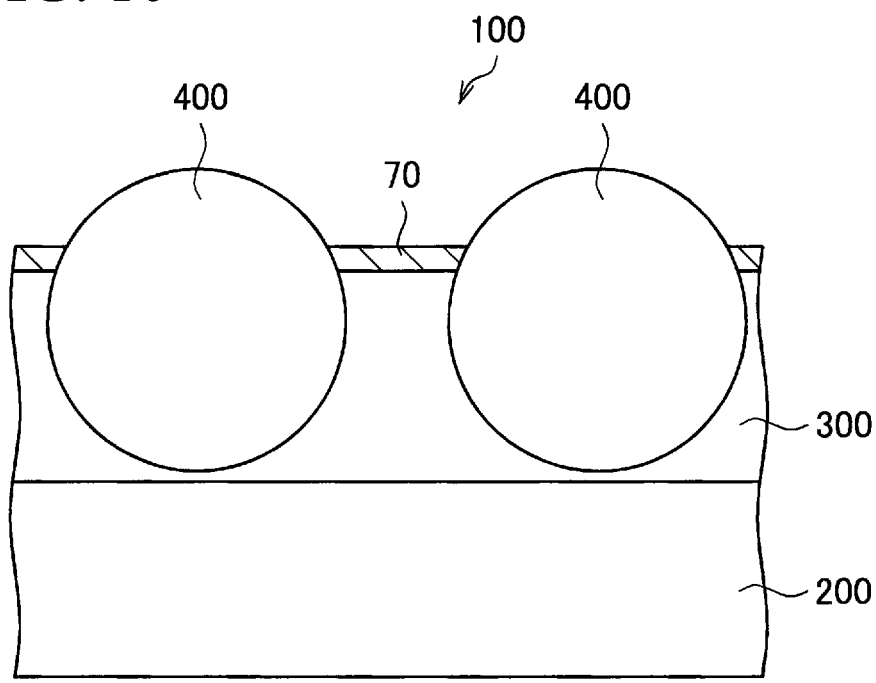
FIG. 10 is a cross-sectional view showing the behavior of the organic resin coating in the related art during press working.

Next, as shown in FIG. 9, a degreasing agent 70 is applied to the surface of the organic resin coating 300. Next, the degreasing agent is removed by washing with water. However, as shown in FIG. 10, since the convex-concave portions due to the beads 400 are formed on the surface of the organic resin coating 300, the degreasing agent 70 remains in the convex-concave portions even after the washing with water. Therefore, in a case where the organic resin-coated plated steel sheet 100 in the related art is subjected to press working, a degreasing agent mark is likely to be formed on the surface of the organic resin-coated plated steel sheet 100.

Figure 2:
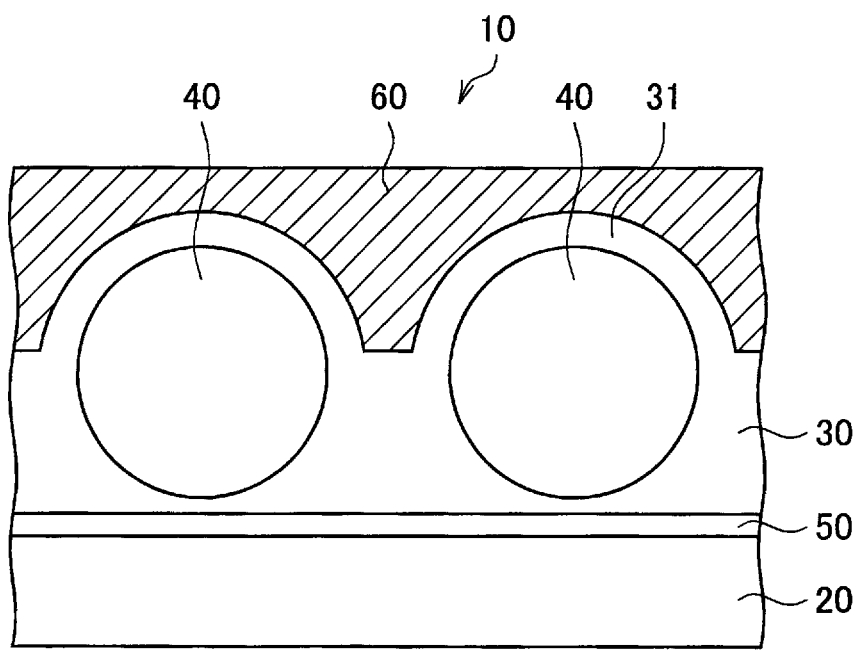
FIG. 2 is a cross-sectional view showing the behavior of an organic resin coating during press working according to the present embodiment.
Figure 3:
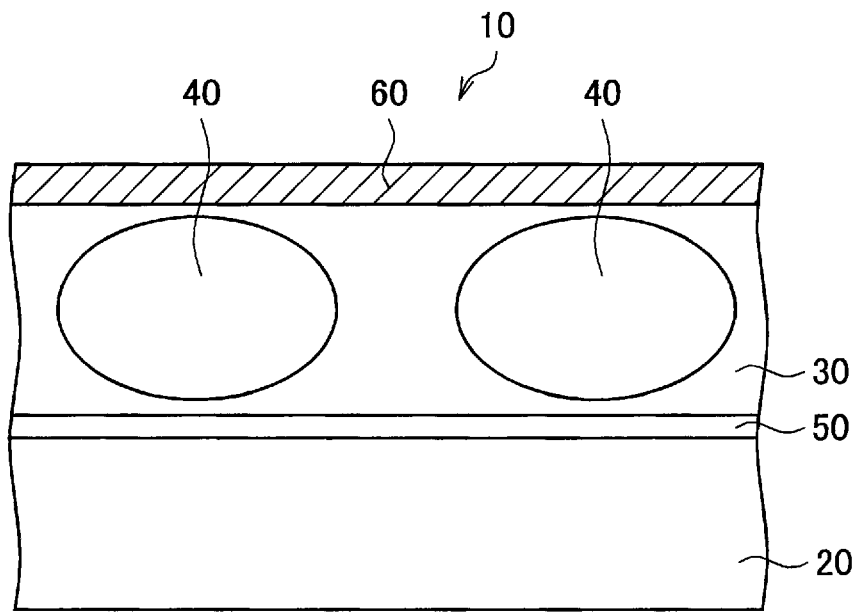
FIG. 3 is a cross-sectional view showing the behavior of the organic resin coating during press working according to the present embodiment.

Next, the behavior of the organic resin coating 30 according to the present embodiment will be shown based on FIGS. 2 to 5. In the present embodiment, the generation of such a degreasing agent mark can be suppressed. First, as shown in FIG. 2, the pressing oil 60 is applied to the surface of the organic resin coating 30. Thereafter, press working is performed. As shown in FIG. 3, the beads 40 are deformed during the press working, so that the surface of the organic resin coating 30 is flattened. In addition, until the surface of the organic resin coating 30 is flattened, convex-concave portions remain on the surface of the organic resin coating 30, so that defect resistance is maintained during the press working. Furthermore, since the pressing oil 60 remains in the convex-concave portions, press formability is also improved. After the press working, the pressing oil 60 remains on the organic resin coating 30.

Figure 4:
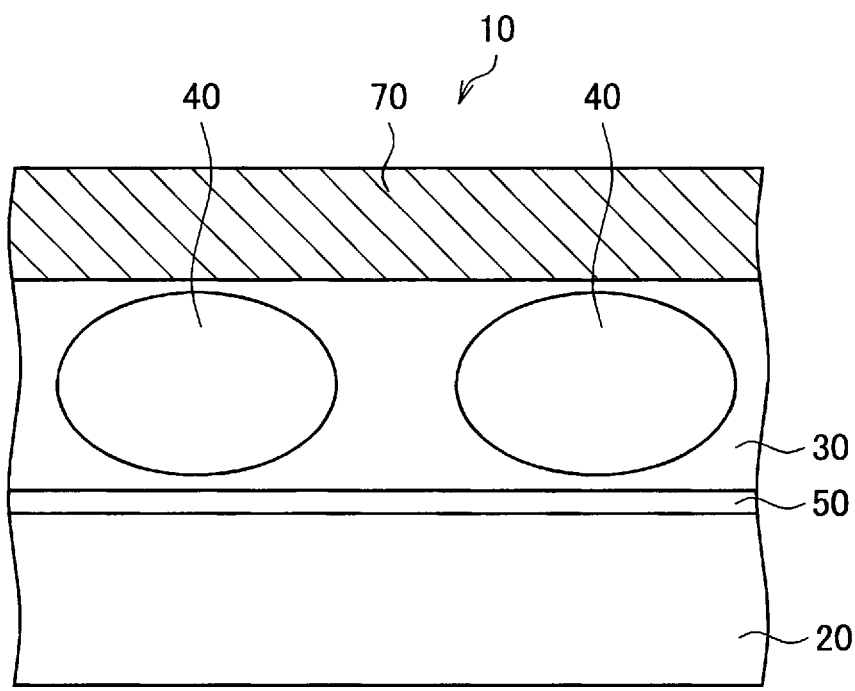
FIG. 4 is a cross-sectional view showing the behavior of the organic resin coating during press working according to the present embodiment.
Figure 5:
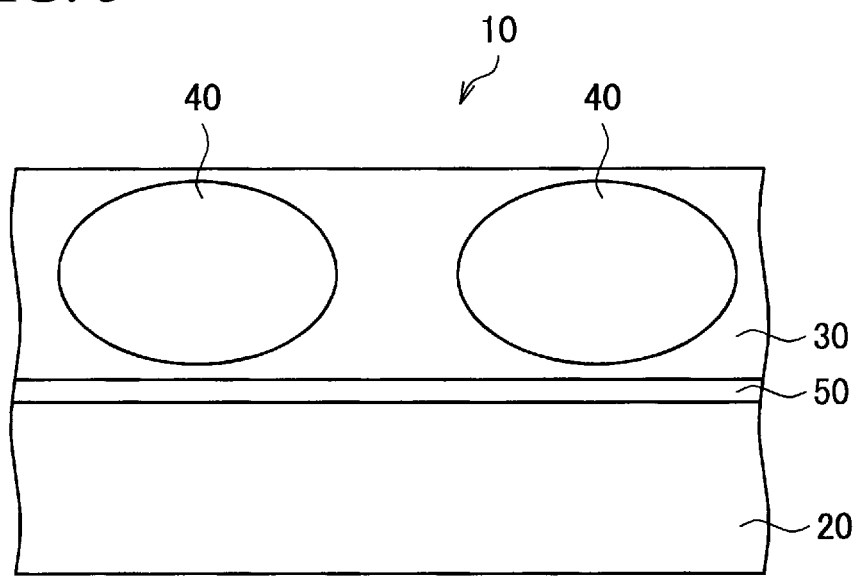
FIG. 5 is a cross-sectional view showing the behavior of the organic resin coating during press working according to the present embodiment.

Next, as shown in FIG. 4, the degreasing agent 70 is applied to the surface of the organic resin coating 30. Next, as shown in FIG. 5, the degreasing agent is removed by washing with water. Here, the surface of the organic resin coating 30 maintains flatness until at least the washing of the degreasing agent 70 with water is completed. Therefore, the degreasing agent 70 can be removed more reliably. That is, the degreasing properties are improved. As a result, it becomes difficult to form a degreasing agent mark on the surface of the organic resin-coated plated steel sheet 10. The organic resin-coated plated steel sheet 10 is dried after being washed with water. Thereafter, the beads 40 are recovered, so that characteristics such as defect resistance are also secured in a subsequent step (for example, an assembly step) using the organic resin-coated plated steel sheet 10.

<3. Detailed Configuration of Organic Resin-Coated Plated Steel Sheet>

Next, the detailed configuration of the organic resin-coated plated steel sheet 10 will be described based on FIG. 1. The organic resin-coated plated steel sheet 10 includes the metal coated steel sheet 20, the organic resin coating 30, the beads 40, and the chemical treatment layer 50.

The metal coated steel sheet 20 is a portion to be a substrate coated with the organic resin coating 30. The metal coated steel sheet 20 is preferably a zinc based-metal coated steel sheet. The kind of zinc based-metal coated steel sheet used in the present embodiment is not particularly limited. The zinc based-metal coated steel sheet may be a generally known zinc based-metal coated steel sheet such as a hot-dip galvanized steel sheet (GI), an electrolytic zinc-metal coated steel sheet (EG), a zinc-nickel alloy metal coated steel sheet, a hot-dip galvannealed steel sheet (GA), an aluminum-zinc alloy metal coated steel sheet, a zinc-aluminum-magnesium alloy metal coated steel sheet, a zinc-vanadium composite metal coated steel sheet, or a zinc-zirconium composite metal coated steel sheet. The metal coated steel sheet 20 may be another kind of metal coated steel sheet, for example, an aluminum-based metal coated steel sheet.

The organic resin coating 30 covers the metal coated steel sheet 20. The organic resin coating 30 is formed on one side of the metal coated steel sheet 20, but may be formed on both sides. Alternatively, the organic resin coating 30 may be formed on one surface of the metal coated steel sheet 20, and another kind of resin coating may be formed on the other surface.

The organic resin coating 30 contains a polyester having a glass transition temperature of 0° C. to 20° C., and a melamine-formaldehyde. The polyester is a resin that is a primary component of the organic resin coating 30. That is, it is preferable that the content ratio of the polyester to the total mass of a polyester and a melamine-formaldehyde is 50 mass % or more. Therefore, in the present embodiment, a coating containing 50 mass % or more of the polyester and the melamine-formaldehyde with respect to the total mass of the polyester and the melamine-formaldehyde is defined as the organic resin coating 30.

The glass transition temperature of the polyester is 0° C. to 20° C. In a case where the glass transition temperature is less than 0° C., the organic resin coating 30 becomes very soft. For this reason, even if the beads 40 are dispersed in the organic resin coating 30, defects are easily formed in the organic resin coating 30 during the press working of the organic resin-coated plated steel sheet. That is, excellent defect resistance cannot be obtained. Furthermore, since the beads 40 are easily recovered after the press working, it is difficult to maintain the flatness of the organic resin coating 30 for a long period of time, and furthermore, the degreasing properties are degraded.

On the other hand, in a case where the glass transition temperature exceeds 20° C., the organic resin coating 30 becomes very hard. As a result, cracking may occur in the organic resin coating 30 during the press working of the organic resin-coated plated steel sheet, and there is a possibility that a phenomenon in which the plating layer of the base material is seen through and looks white, that is whitening may occur. In addition, there is also a possibility that the beads 40 may peel off during the press working. Therefore, the workability of the organic resin-coated plated steel sheet 10 is reduced.

In the present embodiment, by setting the glass transition temperature of the polyester to 0° C. to 20° C., it is possible to enhance the defect resistance, degreasing properties, and workability of the organic resin-coated plated steel sheet 10. Here, at the time of preparation of the organic resin-coated plated steel sheet 10, a desired polyester can be selected, so that the source (for example, product name) of the polyester can be specified. Therefore, in this case, catalog values can be used as the glass transition temperature of the polyester. That is, a polyester in which the catalog value of the glass transition temperature is 0° C. to 20° C. may be selected. On the other hand, in a case where it is necessary to verify whether the prepared organic resin-coated plated steel sheet satisfies the requirements of the present embodiment, it is not easy to identify what polyester is contained in the organic resin coating 30. Therefore, in this case, the glass transition temperature of the organic resin coating 30 may be measured. Even in a case where there is no catalog value for the polyester, the glass transition temperature of the organic resin coating 30 may be used. When the glass transition temperature of the organic resin coating 30 is 0° C. to 35° C., it may be considered that the organic resin coating 30 contains a polyester having a glass transition temperature of 0° C. to 20° C. The glass transition temperature of the organic resin coating 30 can be measured by the following method. In examples described later, the glass transition temperature of the organic resin coating 30 was measured by a needle penetration method.

As a method of measuring the glass transition temperature of the organic resin coating 30, a known method can be used. For example, the glass transition temperature of the organic resin coating 30 can be directly measured at the surface or in the cross-sectional direction by a needle penetration method of thermomechanical analysis (TMA) or a microthermal analysis tester combined scanning probe microscope. Alternatively, the organic resin coating 30 may be removed, and the glass transition temperature of the organic resin coating 30 can be measured by performing differential scanning calorimetry (DSC).

Examples of the polyesters that can be used in the present embodiment include an alkyd resin, an unsaturated polyester, and a modified alkyd resin. The alkyd resin is obtained by using a condensation product of a polybasic acid such as phthalic anhydride and a polyhydric alcohol such as glycerin as a backbone, and modifying the product with a fatty acid oil. The alkyd resin is classified into a short oil alkyd resin, a medium oil alkyd resin, a long oil alkyd resin and an ultra long oil alkyd resin according to the kind and amount of oil used. The unsaturated polyester is synthesized by esterifying an unsaturated polybasic acid or saturated polybasic acid with a glycol. As the polybasic acid, for example, phthalic anhydride, isophthalic acid, terephthalic acid, and adipic acid are used, and as the glycol, for example, propylene glycol is often used. As the modified alkyd resin, for example, one modified with a polymerizable resin such as a natural resin, a phenol resin, or styrene is used. As a matter of course, other known polyesters may be used as long as the glass transition temperature is within the above range.

In addition, as the polyester, commercially available products may be used. Examples of such commercially available products include "VYLON™" (registered trademark of Toyobo Co., Ltd.) manufactured by Toyobo Co., Ltd., "DESMOPHE™" (registered trademark of Sumika Bayer Urethane Co., Ltd) manufactured by Sumika Bayer Urethane Co., Ltd.

The melamine-formaldehyde is a resin that acts as a curing agent. That is, the melamine-formaldehyde causes the polyester to be crosslinked. Therefore, the polyester in the organic resin coating 30 is present as a cross-linked product cross-linked by the melamine-formaldehyde or in a non-cross-linked independent state.

Here, the hardness of the organic resin coating 30 can be adjusted by adjusting the degree of crosslinking with the polyester. When the organic resin coating 30 is too soft, even if the beads 40 are dispersed in the organic resin coating 30, there is a possibility that defects may be easily formed in the organic resin coating 30 during the press working of the organic resin-coated plated steel sheet. On the other hand, when the organic resin coating 30 is too hard, there is a possibility that whitening may occur during the press working of the organic resin-coated plated steel sheet. There is also a possibility that the beads 40 may peel off. Therefore, the workability of the organic resin-coated plated steel sheet 10 is reduced. The specific hardness of the organic resin coating 30 may be appropriately adjusted depending on the application of the organic resin-coated plated steel sheet 10 or the like.

The melamine-formaldehyde is easily made into a paint by being dissolved in an organic solvent. That is, the organic resin-coated plated steel sheet 10 is formed on the metal coated steel sheet 20 by applying a paint containing the material forming the organic resin coating 30 and the beads 40 onto the metal coated steel sheet 20 and drying the paint. Furthermore, the melamine-formaldehyde has a long life in the paint at room temperature and can easily cause the crosslinking reaction to progress within a short period of time when heat is applied thereto. Moreover, in the melamine-formaldehyde, the dispersibility of the beads 40 is also good, and excellent coatability is provided. Therefore, application of the paint to the surface of the metal coated steel sheet 20 is facilitated.

The melamine-formaldehyde that can be used in the present embodiment is not particularly limited, and known melamine-formaldehydes can be used. Examples of the melamine-formaldehyde that can be used in the present embodiment include fully alkylated methylated melamine, imino group type methylated melamine, methylolated melamine, methylol group type methylated melamine, fully alkylated mixed etherified melamine, methylol group mixed etherified melamine, and imino group type mixed etherified melamine. As more specific examples, commercially available products, for example, amino resins "CYMEL™ series" and "MYCOAT™ series" manufactured by Cytec Industries, Inc., amino resins "U-VAN™ series" manufactured by Mitsui Chemicals, Inc., and "SUPER BECKAMINE™ series" manufactured by DIC Corporation can be adopted.

The beads 40 are added to the organic resin coating 30 in order to improve the defect resistance and the like of the organic resin-coated plated steel sheet 10. The glass transition temperature of the beads 40 is −60° C. to 50° C. The glass transition temperature of the beads 40 is preferably −40° C. to 0° C. In a case where the glass transition temperature (hereinafter, sometimes referred to as Tg) of the beads 40 is a value within these ranges, excellent scratch resistance and degreasing properties can be obtained.

In a case where the glass transition temperature of the beads 40 is less than −60° C., the elasticity of the beads 40 becomes too high, and the beads 40 tend to be recovered after press working. For this reason, it is difficult to maintain the flatness of the organic resin coating 30 for a long period of time, and furthermore, the degreasing properties are degraded. In addition, the solvent resistance of the beads 40 themselves is deteriorated, and swelling of the beads 40 by the organic solvent in the paint is likely to occur. In this case, the storage stability of the paint may be insufficient with time. The glass transition temperature of the beads 40 may be set to −40° C. or higher in order to enhance the degreasing properties and the stability of the paint with time.

On the other hand, in a case where the glass transition temperature of the beads 40 exceeds 50° C., the elasticity of the beads 40 becomes very low. For this reason, it is difficult to recover the beads 40 at the time of press working, so that the flatness of the organic resin coating 30 is maintained. However, since the time during which the organic resin coating 30 maintains flatness becomes extremely long, the defect resistance is reduced. The glass transition temperature of the beads 40 may be set to 0° C. or lower in order to increase the defect resistance of the organic resin-coated plated steel sheet 10. Here, at the time of preparation of the organic resin-coated plated steel sheet 10, desired beads 40 can be selected, so that the source (for example, product name) of the beads 40 can be specified. Therefore, in this case, catalog values can be used as the glass transition temperature of the beads 40. On the other hand, in a case where it is necessary to verify whether the prepared organic resin-coated plated steel sheet satisfies the requirements of the present embodiment, there are cases where the source of the beads 40 is unknown. In a case where the source of the beads 40 is unknown (or in a case where there is no catalog value), the glass transition temperature of the beads 40 may be measured by the following method.

As a method of measuring the glass transition temperature of the beads 40, a known method can be used similarly to the glass transition temperature of the organic resin coating 30. For example, the glass transition temperature of the beads 40 can be directly measured at the surface or in the cross-sectional direction by a needle penetration method of TMA or a microthermal analysis tester combined scanning probe microscope.

The surface tension of the beads 40 is preferably 80 to 100 mN/m. In this case, the paint can be applied onto the metal coated steel sheet 20 into a desired thickness. When the surface tension of the beads 40 is less than 80 mN/m, the organic resin coating 30 covering the beads 40 tends to be thick. For this reason, it is difficult to recover the beads 40 at the time of press working, and the defect resistance is reduced. On the other hand, when the surface tension of the beads 40 exceeds 100 mN/m, there is concern that the organic resin coating 30 covering the beads 40 may become too thin or the beads 40 may be exposed from the organic resin coating 30, which is not preferable.

The beads 40 are urethane beads. Accordingly, the defect resistance of the organic resin-coated plated steel sheet 10 can be enhanced. In addition, the surface tension of the beads 40 can be set to a value within the range described above.

Examples of the urethane beads that can be used in the present embodiment include: those obtained by the polyaddition reaction of diisocyanate and a compound having a hydroxyl group; those obtained by causing a diamine to react with a bischloroformic acid ester of a glycol in the presence of a dehydrochlorination agent; those obtained by the reaction of a diamine and ethylene carbonate; those obtained by converting ω-amino alcohol into a chloroformic acid ester or a carbamic acid ester and condensing the converted product; and those obtained by the reaction of bisurethane and a diamine. Among the urethane beads listed above, those obtained by the polyaddition reaction of diisocyanate and a compound having a hydroxyl group are used in many cases. Here, tolylene diisocyanate (a mixture of 2,4-diisocyanate and 2,6-diisocyanate) is used as the diisocyanate in many cases. Furthermore, as the compound having a hydroxyl group, ether compounds such as polyoxypropylene glycol and polyoxypropylene-polyoxyethylene glycol, and polyester compounds obtained by condensing adipic acid and ethylene glycol are used in many cases.

As commercially available products of urethane beads, for example, "ART PEARL" (registered trademark of Negami Chemical Industrial Co., Ltd.) manufactured by Negami Chemical Industrial Co., Ltd., THERPUS (registered trademark) manufactured by Sanyo Chemical Industries, Ltd., and DAIMIC BEAZ manufactured by Dainichiseika Color & Chemicals Mfg. Co., Ltd. can be adopted.

In addition, the beads 40 are contained in the organic resin coating 30 at a ratio of 1 to 15 mass % to the total mass of the organic resin coating 30. In a case where the content ratio of the beads 40 is less than 1 mass %, the defect resistance of the organic resin-coated plated steel sheet 10 is insufficient. In a case where the content ratio of the beads 40 exceeds 15 mass %, the corrosion resistance of the organic resin-coated plated steel sheet 10 is insufficient. In addition, at the time of preparation of the organic resin-coated plated steel sheet 10, since the mass % of the beads 40 can be selected, the mass % of the beads 40 can be made into a value within the above range. On the other hand, in a case where it is necessary to verify whether the prepared organic resin-coated plated steel sheet satisfies the requirements of the present embodiment, the mass % of the beads 40 can be measured by the following method. That is, a cross section parallel to the thickness direction of the organic resin coating 30 (a cross section perpendicular to the surface of the organic resin coating 30) is observed by a field-emission scanning electron microscope (FE-SEM). Then, the area ratio of the beads 40 in this cross section (the area ratio of the beads 40 to the total area of the cross section) is measured. The area ratio of the beads 40 corresponds to the volume fraction of the beads 40 to the total volume of the organic resin coating 30. In addition, the mass % of the beads 40 is measured based on the specific gravities of the beads 40 and the other resin part (these are determined by actual measurement) and the volume fraction of the beads 40. The volume fraction of the beads 40 may be specified by observing the surface of the organic resin-coated plated steel sheet 10 by the same method as the method of measuring the dispersion degree of the beads 40, which will be described later. Parts with a protruding surface are regions where the beads are present.

The mass % of the beads 40 may be obtained by the following method. First, the total mass Wp (g) of the organic resin coating 30 is measured by a gravimetric method based on peeling of the organic resin coating. Next, the dispersion degree ρs [pieces/mm$^2$] of the beads 40 is obtained by the method described below. Next, the total mass Wb of the beads 40 is obtained by the following equation.

$$W_b = (4\pi/3) \times ((\varphi/2)^3 \times S \times \rho_s \times \rho_b$$

In the above formula, φ is the average particle size of the beads 40, and $\rho_b$ is the specific gravity [g/cm$^3$] of the beads 40. The specific gravity of the beads 40 is, for example, about 1.2 [g/cm$^3$]. S is the measurement area (area of the peeled part) [mm$^2$] when the total mass of the organic resin coating 30 is obtained. Next, the mass % of the beads 40 is obtained by the following formula.

$$\text{Mass \% of beads} = 100 \times W_b / W_p \text{[mass \%]}$$

The beads 40 are dispersed in the organic resin coating at an area density of 5 to 1000 pieces/mm$^2$. In the present embodiment, the dispersion degree of the beads is indicated not by volume density but by area density. Since the particle size of the beads 40 in the present embodiment is larger than the film thickness of the organic resin coating 30, the plurality of beads 40 do not overlap in the thickness direction of the organic resin coating 30. For this reason, the dispersion degree of the beads 40 can be expressed by "area density". In order to obtain excellent scratch resistance, it is preferable that the dispersion degree of the beads 40 is high. When the dispersion degree of the beads 40 is less than 5 pieces/mm$^2$, the amount of the beads 40 dispersed in the organic resin coating 30 is small, and sufficient scratch resistance cannot be obtained. As the dispersion degree of the beads 40 increases, the amount of the beads 40 increases, and the scratch resistance is improved. However, when the dispersion degree of the beads 40 becomes too high, the amount of the organic resin coating for adhesion of the beads 40 relatively decreases, and the adhesion between the resin and the beads 40 is not sufficient. As a result, there are cases where the beads 40 peel off the organic resin coating 30, and excellent scratch resistance is not be obtained. Therefore, the dispersion degree of the beads A is set to 1000 pieces/mm$^2$ or less.

The dispersion degree of the beads 40, that is, the area density can be measured by the following method. That is, the surface of the organic resin-coated plated steel sheet 10 is observed with an optical microscope or a scanning electron microscope, the number of beads 40 in a visual field of 1 mm$^2$ is measured, and the measured value is taken as the dispersion degree. The number of beads completely contained in the frame of the visual field is counted as one, and the number of beads partially contained in the frame of the visual field is counted as 0.5. Regarding the display method of the dispersion degree, in a case where the integer part of the dispersion degree is one digit, the dispersion degree is rounded off to the nearest whole number, in a case where the integer part of the dispersion degree is two digits or three digits, the dispersion degree is rounded off to the nearest tenth, and in a case where the integer part of the dispersion degree is four or more digits, the dispersion degree is rounded off to the nearest hundredth. The beads 40 in the present embodiment protrude from the surface of the organic resin coating 30. Therefore, the beads 40 can be easily counted by observation from the surface. In the examples described below, the dispersion degree of the beads 40 was measured by this method.

Furthermore, assuming that the average film thickness of parts where the beads 40 are not present (hereinafter, also referred to as flat portions 32) in the organic resin coating 30 is T (μm), the average particle size of the beads 40 is φ (μm), the average film thickness of parts of bead coating 31 covering the beads 40 in the organic resin coating 30 is t (μm), the glass transition temperature of the polyester is Tgp (° C.), and the glass transition temperature of the beads 40 is Tgb (° C.), the relationships of Formulas (1) to (3) are satisfied.

$$5 \leq T \leq 15 \ \mu m \quad (1)$$

$$1.1 \leq \varphi/T \leq 10 \quad (2)$$

$$13 \leq (\varphi/t) \times \{(Tgb+273)/(Tgp+273)\} \leq 140 \quad (3)$$

In a case where the average film thickness of the flat portions 32 is less than 5 μm, the corrosion resistance is insufficient. In a case where the average film thickness of the flat portions 32 exceeds 15 μm, the cost of the organic resin-coated plated steel sheet 10 becomes very high.

In a case where φ/T is less than 1.1, the defect resistance of the organic resin-coated plated steel sheet 10 is reduced. This is because, in this case, the amount of the beads 40 protruding from the flat portions 32 is reduced. In a case where φ/T exceeds 10, the beads 40 are easily recovered after press working. For this reason, it is difficult to maintain the flatness of the organic resin coating 30 for a long period of time, and furthermore, the degreasing properties are degraded. Furthermore, since the beads 40 easily peel off during press working, the workability is also reduced. Here, φ/T is preferably 1.1 to 5. In a case where φ/T exceeds 5, there is a possibility that the organic resin coating 30 may not be completely flat after press working. However, as described later in the examples, the effects of the present embodiment can be obtained even in a case where φ/T exceeds 5.

In Formula (3), the term (φ/t) is the ratio of the average particle size φ (μm) of the beads 40 to the average film thickness t (μm) of the part of bead coating 31. The larger the term, the larger the average particle size of the beads 40 with respect to the average film thickness of the part of bead coating 31. Therefore, the beads 40 are easily recovered after press working. The term $\{(Tgb+273)/(Tgp+273)\}$ is the ratio of the absolute temperature conversion value of the glass transition temperature of the beads 40 to the absolute temperature conversion value of the glass transition temperature of the polyester. Since the ratio of the hardness of the bead to the hardness of the polyester increases as the item increases, the beads 40 are more easily recovered after press working. The present inventors conducted intensive examinations on the effect of the value obtained by multiplying these terms on the organic resin coating 30, the productivity of the organic resin coating 30, and the like, and as a result, found that it is preferable that Formula (3) is satisfied. That is, in a case where $(\varphi/t) \times \{(Tgb+273)/(Tgp+273)\}$ is less than 13, the time during which the organic resin coating 30 maintains flatness becomes extremely long, so that the defect resistance decreases. In a case where $(\varphi/t) \times \{(Tgb+273)/(Tgp+273)\}$ exceeds 140, the beads 40 are easily recovered after press working. For this reason, it is difficult to maintain the flatness of the organic resin coating 30 for a long period of time, and furthermore, the degreasing properties are degraded. Here, $(\varphi/t) \times \{(Tgb+273)/(Tgp+273)\}$ is preferably 15 to 50, and more preferably 20 to 37. In a case where the value of $(\varphi/t) \times \{(Tgb+273)/(Tgp+273)\}$ falls within these ranges, a further improvement in the quality of the organic resin coating 30 can be expected. Furthermore, in a case where the value of $(\varphi/t) \times \{(Tgb+273)/(Tgp+273)\}$ is 50 or less, it can also be expected that the quality of the organic resin coating 30 is stabilized.

Here, the average film thickness of the flat portions 32 is measured by the following method. That is, the vertical cross section of the organic resin-coated plated steel sheet 10 (the cross section parallel to the thickness direction of the organic resin-coated plated steel sheet 10, that is, the cross section shown in FIG. 1) is observed with the FE-SEM. Subsequently, the maximum thickness at a place where there are no beads 40 (that is, a region where the surface of the organic resin coating 30 and the surface of the metal coated steel sheet 20 are substantially parallel to each other) in a visual field at a magnification of 10,000-fold is obtained, 10 random visual fields are observed, and the average (arithmetic average) of the largest 10 points may be taken as the average film thickness of the flat portions 32. In the following examples, the average film thickness of the flat portions 32 was measured by this method.

As the average particle size of the beads 40, catalog values of the beads 40 may be used. In the examples described later, the catalog values of the beads 40 were used. In a case where there is no such value, the average particle size may be measured by the following method. That is, the surface of the organic resin-coated plated steel sheet 10 is polished, and a cross section (flat cross section in this case) formed by the polishing is observed with the FE-SEM. The cross-sectional diameter of the beads 40 gradually increases with each repetition of polishing, and finally reaches the maximum value. This maximum value corresponds to the particle size of the beads 40. As polishing continues further, the cross-sectional diameter decreases. Therefore, the cross-sectional diameter of the beads 40 observed in a certain visual field is measured each time the polishing is performed, and the largest measured value is taken as the particle size of the bead 40. Then, the arithmetic average value of the particle sizes of a plurality of (for example, 20) beads 40 randomly selected is taken as the average particle size of the beads 40. In addition, in a case where the cross-sectional diameter initially observed becomes the maximum value, there is a possibility that the cross-sectional diameter may be smaller than the actual particle size. Therefore, the cross-sectional diameter is excluded from the object when the average value is obtained.

The polishing method is not particularly limited, and known methods can be employed. For example, resin embedded polishing or microtome processing can be used. Particularly in a case where the average particle size of the beads 40 is obtained with high accuracy, as the polishing method, cryo scanning electronscopy combined with focused ion beam (cryo FIB-SEM) is appropriate. Since the sample is worked with ion beams by setting the sample temperature to about −100° C., damage to the coating due to heat generation caused by the ion beam irradiation is small, and polishing in units of subnanometers is possible. Therefore, the particle size of eave small beads can be obtained.

The average film thickness of the parts of bead coating 31 is measured by the following method. Here, the part of bead coating 31 is a portion coating the protrusion portion (portion protruding from the flat portion 32) of the bead 40. The bead diameter is measured while gradually and repeatedly polishing the cross section shown in FIG. 1 by the same method as the method of measuring the average particle size of the beads 40. At this time, the thickness of the organic resin coating present in the 12 o'clock direction (upward direction in FIG. 1) from the center of the bead 40 when the cross-sectional diameter of the bead 40 reaches the maximum value is measured. The average film thickness of the parts of bead coating 31 the arithmetic average values of a plurality of (for example, 20) points randomly selected. In the examples described later, the average film thickness was measured by this method. The range of the average film thickness of the part of bead coating 31 is preferably 0.3 to 1.0 μm from the viewpoint of the balance between the maintenance of the defect resistance and the time during which the flatness of the organic resin coating 30 is maintained. In a case where the average film thickness of the part of bead coating 31 is less than 0.3 μm, the beads 40 are easily recovered, and there is a possibility that the time during which the flatness of the organic resin coating 30 is maintained may be shortened. There is also a possibility that the part of bead coating 31 may break. On the other hand, in a case where the average film thickness of the part of bead coating 31 exceeds 1.0 μm, the time during which the flatness of the organic resin coating 30 is maintained may be too long, and the defect resistance may be reduced.

The glass transition temperature Tgp of the polyester is included in Formula (3). As described above, in a case where it is necessary to verify whether the prepared organic resin-coated plated steel sheet satisfies the requirements of the present embodiment, it is not easy to identify what polyester is contained in the organic resin coating 30. Therefore, in this case, Formula (3') may be used instead of Formula (3). That is, the organic resin-coated plated steel sheet 10 according to the present embodiment satisfies the requirement of Formula (3') in addition to Formulas (1) and (2). In Formula (3'), Tgf is the glass transition temperature of the organic resin coating 30, and the meanings of the other symbols are the same as in Formula (3).

$$10 \leq (\varphi/t) \times \{(Tgb+273)/(Tgf+273)\} \leq 115 \quad (3')$$

The technical significance of Formula (3') is the same as Formula (3). That is, the term $\{(Tgb+273)/(Tgf+273)\}$ is the ratio of the absolute temperature conversion value of the glass transition temperature of the beads 40 to the absolute temperature conversion value of the glass transition temperature of the organic resin coating 30. It can be said that the bead becomes harder than the organic resin coating 30 as this term increases, so that the beads 40 are easily recovered after press working. The present inventors conducted intensive examinations on the effect of the value obtained by multiplying these terms on the organic resin coating 30, the productivity of the organic resin coating 30, and the like, and as a result, found that it is preferable that Formula (3') is satisfied. That is, in a case where $(\varphi/t) \times \{(Tgb+273)/(Tgf+273)\}$ is less than 10, the time during which the organic resin coating 30 maintains flatness becomes extremely long, so that the defect resistance decreases. In a case where $(\varphi/t) \times \{(Tgb+273)/(Tgf+273)\}$ exceeds 115, the beads 40 are easily recovered after press working. For this reason, it is difficult to maintain the flatness of the organic resin coating 30 for a long period of time, and furthermore, the degreasing properties are degraded. Here, $(\varphi/t) \times \{(Tgb+273)/(Tgf+273)\}$ is preferably 15 to 55, and more preferably 16 to 32. In a case where the value of $(\varphi/t) \times \{(Tgb+273)/(Tgf+273)\}$ falls within these ranges, a further improvement in the quality of the organic resin coating 30 can be expected. Furthermore, in a case where the value of $(\varphi/t) \times \{(Tgb+273)/(Tgf+273)\}$ is 55 or less, it can also be expected that the quality of the organic resin coating 30 is stabilized.

The organic resin coating 30 may further contain at least one or more of 3 to 15 mass % of carbon black, 1 to 10 mass % of calcium-modified silica, and 0.5 to 5 mass % of an epoxy resin. In addition, the content ratios thereof are all mass % with respect to the total mass of the organic resin coating 30.

The carbon black acts as a black pigment of the organic resin coating 30, and can realize desired beauty (blackness). In a case where the content ratio of the carbon black is less than 3 mass %, sufficient blackness may not be obtained. As a result, there is a possibility that the metal coated steel sheet 20 may be visually recognized. That is, there is a possibility that the concealability of the organic resin-coated plated steel sheet 10 may be reduced. On the other hand, in a case where the content ratio of the carbon black exceeds 15 mass %, there is a possibility that corrosion resistance may decrease.

The kind of carbon black that can be used in the present embodiment is not particularly limited. For example, known carbon blacks such as furnace black, ketjen black, acetylene black, and channel black can be used. In addition, carbon black subjected to known ozone treatment, plasma treatment, or liquid phase oxidation treatment may be used. The particle size of the carbon black to be used is not particularly limited as long as there is no problem in dispersibility in the paint, coating quality, and coatability. For example, carbon black having a primary particle size of 10 to 120 nm may be used. In consideration of the design (coloring properties and concealability) and corrosion resistance of a thin film, it is preferable to use fine particle carbon black having a primary particle size of 10 to 50 nm. It is generally difficult to disperse the carbon black in a state of primary particles because such carbon black agglomerates during the process of dispersing in a paint. That is, in practice, the carbon black is also present in the form of secondary particles having a particle size larger than the primary particle size and is also present in the same form in a black coating formed from the paint.

The calcium-modified silica acts as an antirust pigment for the organic resin coating 30, and can maintain the beauty of the organic resin-coated plated steel sheet 10 for a long period of time. Furthermore, the calcium-modified silica is hard itself and thus increases the hardness of the organic resin coating 30, thereby improving the defect resistance. In a case where the content ratio of calcium-modified silica is less than 1 mass %, there is a possibility that the corrosion resistance may be reduced. On the other hand, in a case where the content ratio of the calcium-modified silica exceeds 10 mass %, the ratio of the other components of the organic resin coating 30 may be relatively decreased, and sufficient performance may not be obtained.

The epoxy resin can enhance the adhesion between the organic resin coating 30 and the metal coated steel sheet 20. That is, the epoxy resin can cause the organic resin coating 30 to be less likely to peel off from the metal coated steel sheet 20 at the time of press working of the organic resin-coated plated steel sheet 10. That is, working adhesion is improved. Furthermore, since the epoxy resin also improves the adhesion between the organic resin coating 30 and the beads 40, the epoxy resin also contributes to the improvement of the scratch resistance. Here, in a case where the content ratio of the epoxy resin is less than 0.5 mass %, there is a possibility that the working adhesion may be reduced. In a case where the content ratio of the epoxy resin exceeds 5 mass %, the ratio of the other components of the organic resin coating 30 may be relatively lowered, and sufficient performance may not be obtained. As the epoxy resin, for example, a bisphenol A type epoxy resin, an acrylic modified epoxy resin, and a bisphenol F type epoxy resin can be used.

The chemical treatment layer 50 is formed between the organic resin coating 30 and the metal coated steel sheet 20. The chemical treatment layer 50 is obtained by subjecting the surface of the metal coated steel sheet 20 to a chemical conversion treatment. Since the adhesion between the organic resin coating 30 and the metal coated steel sheet 20 is improved by the chemical treatment layer 50, the working adhesion is improved.

The kind of chemical conversion treatment is not particularly limited. Examples of the chemical conversion treatment that can be performed in the present embodiment include a chemical conversion treatment for a zinc based-metal coated steel sheet. For example, the chemical conversion treatment may be a zinc based phosphate chemical conversion treatment, a coating chromate treatment, an electrolytic chromic acid treatment, a reaction chromate treatment, or a chromate-free chemical conversion treatment. As the chromate-free chemical conversion treatment, a method of treating a zinc based-plated layer with an aqueous solution containing a silane coupling agent, a zirconium compound, a titanium compound, tannin, or tannic acid, a resin, silica, and the like is known. The chemical conversion treatment of the present embodiment may be a known chemical conversion treatment disclosed in Japanese Unexamined Patent Application, First Publication No. S53-9238, Japanese Unexamined Patent Application, First Publication No. H9-241576, Japanese Unexamined Patent Application, First Publication No. 2001-89868, Japanese Unexamined Patent Application, First Publication No. 2001-316845, Japanese Unexamined Patent Application, First Publication No. 2002-60959, Japanese Unexamined Patent Application, First Publication No. 2002-38280, Japanese Unexamined Patent Application, First Publication No. 2002-266081, Japanese Unexamined Patent Application, First Publication No. 2003-253464, or the like. As a treatment solution for performing these chemical conversion treatments, a commercially available chemical conversion treatment solution, for example, a chromate treatment solution "ZM-1300AN" manufactured by Nihon Parkerizing Co., Ltd., a chromate-free chemical conversion treatment solution "CT-E300N" manufactured by Nihon Parkerizing Co., Ltd., and a trivalent chromium-based chemical conversion treatment solution "SURFCOAT® NRC 1000" manufactured by Nippon Paint Surf Chemicals Co., Ltd. can be adopted. In addition, the chemical treatment layer 50 may be omitted.

<4. Method of Manufacturing Organic Resin-Coated Plated Steel Sheet>

A method of manufacturing the organic resin-coated plated steel sheet 10 is not particularly limited, and for example, a method of preparing the paint containing the material forming the organic resin coating 30 and the beads 40 and applying and drying this paint on the metal coated steel sheet 20 is adopted.

Here, the surface tension of the paint is preferably 20 to 35 mN/m, and the viscosity of the paint is preferably 300 to 1000 mPa·s. In a case where these conditions are satisfied, the paint can be applied onto the metal coated steel sheet 20 into a desired thickness. In a case where the surface tension of the paint is less than 20 mN/m, the organic resin coating 30 becomes too thin, and there is a possibility that the beads 40 may be easily recovered and the degreasing properties may be degraded. In a case where the surface tension of the paint exceeds 35 mN/m, the distribution of the beads 40 may become uneven, which may result in a reduction in the defect resistance. In addition, in a case where the viscosity of the paint is less than 300 mPa·s, the organic resin coating 30 becomes too thin, and there is a possibility that the beads 40 may be easily recovered and the degreasing properties may be degraded. In a case where the viscosity of the paint exceeds 1000 mPa·s, the distribution of the beads 40 may become uneven, which may result in a reduction in the defect resistance. That is, by setting the surface tension and the viscosity of the paint and the surface tension of the beads within the above ranges, an organic resin coating having the above-described characteristics can be formed.

The application method is not particularly limited, and an application method applicable to a manufacturing method in the related art can also be used in the present embodiment. Examples of the application method include a curtain coater method, a roll coater method, a die coater method, and a doctor blade method. Among these methods, the curtain coater method is preferable. This is because a paint having a viscosity as high as 300 to 1000 mPa·s can be applied more uniformly according to the curtain coater method.

Moreover, the kind of organic solvent used for the paint is not particularly limited, and an organic solvent applied to the manufacturing method in the related art can also be used in the present embodiment. As the organic solvent, for example, a mixture of cyclohexanone, MEK, xylene, SOLVESSO 150, and the like can be used. The formulation of these organic solvents can be adjusted for use according to the solubility of the resin used.

EXAMPLES

<1. Preparation of Varnish Paint>

Amorphous polyesters manufactured by Toyobo Co., Ltd. "VYLON (registered trademark) 500 (Tg: 4° C.)", "VYLON (registered trademark) 270 (Tg 50° C.)", and "VYLON (registered trademark) {UR-6100 (Tg–30° C.)"} were dissolved in an organic solvent (a mixture of cyclohexanone:Solvesso 150 (product name)=1:1 by mass ratio was used). Here, the glass transition temperature Tgp of the entire polyester was adjusted by adjusting the mixing ratio of these polyesters. Next, as a curing agent, a melamine-formaldehyde "CYMEL (trademark) 303" manufactured by Mitsui-Cytec Ltd. was added to the solution. The added amount of the melamine-formaldehyde was adjusted so that the ratio of the solid content of the polyester:the solid content of the melamine-formaldehyde was as shown in Tables 1 to 6 by the mass ratio of the solid content of the resin. To the mixed solution of the polyester and the melamine-formaldehyde, 0.5 mass % of an acidic catalyst "CATALYST 600" ("crosslinking reaction product" in Tables 1 to 6) manufactured by Mitsui-Cytec Ltd. was further added. In addition, at the time of preparation of some of test materials, an epoxy resin "EPICLON EXA-123" manufactured by DIC Corporation was added to the mixed solution in the ratio shown in Tables 1 to 6. Then, the mixed solution was stirred, whereby a varnish paint was obtained.

<2. Preparation of Paint for Steel Sheet Application>

In the above varnish paint, each of carbon black "TOKABLACK #7300" manufactured by Tokai Carbon Co., Ltd. as carbon black, calcium-modified silica "SHIELDEX C303" manufactured by Grace Materials Technologies as an antirust pigment, ART PEARL manufactured by Negami Chemical Industrial Co., Ltd. as urethane beads, "MBX" manufactured by Sekisui Chemical Co., Ltd. as acrylic beads, and "SP series" manufactured by Toray Industries, Inc. as nylon beads was dispersed in a ratio shown in Tables 1 to 6, whereby a predetermined paint for steel sheet application was prepared. The surface tension and viscosity of the paint for steel sheet application were measured by the following methods. That is, the surface tension of the paint was measured by a platinum ring method using DY-300 manufactured by Kyowa Interface Science, Inc. Furthermore, the viscosity of the paint was measured by a tuning-fork type vibration viscometer (SV-10) manufactured by A&D Company, Limited. The paint temperature was 25° C. in all cases. Regarding the surface tension of the beads, the contact angle of particles was measured using PW-500 manufactured by Kyowa Interface Science, Inc., and the surface tension of the beads was obtained based on the contact angle.

<3. Preparation of Test Materials>

Next, an electrolytic zinc-metal coated steel sheet (plating adhesion amount 20 g/m² per one surface) was prepared, and the above-described paint for steel sheet application was applied to both surfaces thereof and dried. Accordingly, test materials prepared. In addition, when some of the test materials were prepared, a chemical treatment layer was formed on the surface of the electrolytic zinc-metal coated steel sheet, and an organic resin coating was formed on the chemical treatment layer. The chemical treatment layer was formed by applying a chromate-free chemical conversion solution "CT-E300N" manufactured by Nihon Parkerizing Co., Ltd. under the condition that the adhesion amount after drying was 100 mg/m², and drying the solution at a steel sheet temperature of 60° C. A plurality of kinds of test materials #1 to 52 with various parameters changed were prepared. Test materials #1 to #5 are those in which the glass transition temperature Tgp of the polyester was changed. Test materials #6 to #9 are those in which the amount of the beads was changed. Test materials #10 to #13 are those in which the glass transition temperature Tgb of the beads was changed. Test materials #14 to #17 are those in which the dispersion degree of the beads was changed. Test materials #18 to #19 are those in which the kind of beads (the type of resin) was changed. Test materials #20 to #23 are those in which the average film thickness of the portion where the beads were not present was changed. Test materials #24 to #27 are those in which the value of φ/T was changed. Test materials #28 to #31 are those in which the value of Formula (3) was changed. Test materials #32 to #35 are those in which the amount of the epoxy resin was changed. Test materials #36 to #39 are those in which the amount of the carbon black was changed. Test materials #40 to #43 are those in which the amount of the calcium-modified silica was changed. Test material #44 has a chemical treatment layer formed therein. Test materials #45 to #47 are those in which the surface tension of the paint for steel sheet application was changed. Test materials #48 to #50 are those in which the viscosity of the paint for steel sheet application was changed. Test materials #51 to #52 are those in which the surface tension of the beads was changed. Test material #53 is one in which the average film thickness of the part of bead coating 31 was 0.3 μm. Test material #54 is one in which the value of Formula (3) was set to a value approximating 37. Test material #55 is one in which the value of Formula (3) was set to a value approximating 50. Test materials #56 and #57 were prepared under the same manufacturing conditions as test material #30. The physical property values of the respective test materials are summarized in Tables 1 to 6. Underlined numerical values in the tables indicate values outside of the present embodiment.

<4. Evaluation Tests>

Next, the following evaluation tests were conducted. The results are summarized in Tables 1 to 6.

(4-1. Restoration Time of Beads)

Using a laser microscope, the height ($h_0$) of the bead at a random position on the initial design surface (the surface of the test material which was not worked) was measured. Thereafter, a mirror-polished stainless steel sheet was pressurized at a pressure of 10 MPa. The pressurization time was five seconds. The height ($h_x$) of the bead immediately after the pressurization was measured with the laser microscope. $h_x$ was measured every 20 minutes immediately after press working. Thereafter, the time for $h_x/h_0$ to exceed 0.8 was determined as the restoration time of the bead. The test was conducted in an air-conditioned room, and the steel sheet, the pressing die, and the room temperature were controlled at 25±3° C. The acceptance level was set to 1 to 5 (hr).

(4-2. Degreasing Properties)

A pressing oil was applied to the initial design surface, and the mirror-polished stainless steel sheet was pressurized at a pressure of 10 MPa. The pressurization time was five seconds. As the pressing oil, PG3080 manufactured by Nihon Kohsakuyu Co., Ltd. was used. Thereafter, degreasing was performed by spraying a degreasing solution onto the designed surface after the pressurization. As the degreasing solution, a solution obtained by dissolving FINE CLEANER 4326 manufactured by Nihon Parkerizing Co., Ltd. in distilled water at a concentration of 20 g/L was used. The temperature of the degreasing solution was set to 50±5° C., and the degreasing time was set to 60 seconds. Thereafter, the surface of the steel sheet was washed with water and dried, and the residual degreasing agent on the surface was visually evaluated. The acceptance level was set to 3 or more.

(4-2-1. Evaluation Criteria)

5: No degreasing agent mark is visible even when viewed from the front or obliquely 4: No degreasing agent mark is visible when viewed from the front, and a slight degreasing agent mark is visible when viewed obliquely 3: A slight degreasing agent mark is visible when viewed from the front, and a slight degreasing agent mark is visible when viewed obliquely 2: A slight degreasing agent mark is visible when viewed from the front, and a degreasing agent mark is clearly visible when viewed obliquely 1: Degreasing agent marks are clearly visible even when viewed from the front or diagonally (4-3. Defect Resistance)

Each test material was brought into close contact with an electrolytic zinc-metal coated steel sheet (non-treated material), and the test material was rotated 90° in a pressurized state. The pressurization was performed under 0.5 kg/cm$^2$, and the test temperature was set to 25° C. Thereafter, the external appearance of the test material was visually evaluated. The acceptance level was set to 3 or more.

(4-3-1. Evaluation Criteria)

5: No scratch is visible

4: There are a few scratches, but the base is not exposed

3: The base is slightly exposed (exposed area: less than 5% of the total area of one side of the test material)

2: The base is exposed (exposed area: 5% or more and less than 10% of the total area of one side of the test material)

1: The base is exposed (exposed area: 10% or more of the total area of one side of the test material)

(4-4. Workability)

The central part of the design surface of the test material was subjected to extrusion using an Erichsen tester (based on A dimension of JIS Z 2247) until the test piece was broken. Here, as the electrolytic zinc-metal coated steel sheet, one having a sheet thickness of 0.4 mm was used, and the material of the electrolytic zinc-metal coated steel sheet was selected so that the extrusion height was 14 mm or more. Then, the worked portion was observed visually or with a 10× loupe, and the degree of whitening was evaluated. Here, whitening is a phenomenon in which the coating film is cracked in the worked portion and the plating layer of the base is seen through. The acceptance level was set to 3 or more.

(4-4-1. Evaluation Criteria)

5: No whitening is observed with the loupe

4: Whitening is observed only near a broken portion with the loupe, but whitening is not observed visually 3: Whitening is slightly observed visually only near a broken portion (level visible within a distance of 10 cm to the test piece)

2: Whitening is clearly observed visually only near a broken portion (level visible within a distance of 50 cm to the test piece)

1: Whitening is observed visually even outside the vicinity of a broken portion (4-5. Working Adhesion)

The test material was subjected to OT bending (180° bending), the coating on the outside of the bent portion was peeled off with a tape, and the coating adhesion state on the tape side was observed. Then, working adhesion was evaluated by the following evaluation criteria. In this adhesion test, the acceptance level was set to 3 or more. Specifically, in a case where the grade was 4 or more, the adhesion was excellent, and it was determined that 3 or more was acceptable (acceptance level).

(4-5-1. Evaluation Criteria)

5: There is no coating adhesion on the tape side

4: The peeling length on the steel sheet side is less than 5% with respect to the total length of the worked portion on one side of the test material in a state where there are several points of coating peeled on the tape side 3: The peeling length on the steel sheet side is 5% or more and less than 10% with respect to the total length of the worked portion on one side of the test material in a state where there are several points of coating peeled on the tape side 2: There are peeled coatings on the tape side, and the peeling length on the steel sheet side is 10% or more and less than 20% with respect to the total length of the worked portion on one side of the test material 1: There are peeled coatings on the tape side, and the peeling length on the steel sheet side is 20% or more with respect to the total length of the worked portion on one side of the test material (4-6. Corrosion Resistance)

The central part of the design surface of the test material was subjected to 6 mm extrusion with an Erichsen tester (based on A dimension of JIS Z 2247). Subsequently, the end surface of the test material was tape-sealed, and a salt spray test (SST) based on JIS Z 2371 was performed for 120 hours. The rust generation condition of the part subjected to the extrusion was observed after the completion of the test, and corrosion resistance was evaluated by the following evaluation criteria. The acceptance level was set to 3 or more.

<Evaluation Criteria>

5: The area of white rust is less than 1% of the total area of one side of the test material 4: The area of white rust is less 1% or more and less than 5% of the total area of one side of the test material 3: The area of white rust is 5% or more and less than 10% of the total area of one side of the test material 2: The area of white rust is 10% or more and less than 30% of the total area of one side of the test material 1: The area of white rust is 30% or more of the total area of one side of the test material (4-7. Stability of Paint with Time)

After preparing the paint for steel sheet application, the paint was made to deteriorate with time at a temperature of 40° C. for one month. The paint which had deteriorated with time was applied onto a steel sheet, and the coated sheet after being hardened by baking was observed visually and a 30× loupe. The stability of the paint with time was evaluated by the following evaluation criteria.

(4-7-1. Evaluation Criteria)

O: There is no solid in the paint

X: There is a solid in the paint and can be seen visually

<5. Consideration>

The results that were unacceptable in the evaluation tests were underlined. As is clear from the results shown in Tables 1 to 6, while the test materials satisfying the conditions of the present embodiment, that is, the examples obtained the acceptable results in all the evaluation items, the comparative examples obtained unacceptable results in some of the evaluation items. Although test material #23 had good performance, the film thickness of the organic resin coating was too thick, and the manufacturing cost became very high. Test material #28 had a very slow bead restoration and Test material #31 had a very fast bead restoration. Comparison of test materials #32 to #35 showed that particularly good results were obtained in a case where the amount of the epoxy resin was a value within the preferable range. Comparison of test materials #36 to #39 showed that particularly good results were obtained in a case where the amount of the carbon black was a value within the preferable range.

Comparison of test materials #40 to #43 showed that particularly good results were obtained in a case where the amount of the calcium-modified silica was a value within the preferable range. According to test material #44, it was found that particularly good results can be obtained by forming the chemical treatment layer. According to test materials #1, and #53 to #55, it became clear that particularly good results can be obtained in a case where the average film thickness of the part of bead coating 31 or the value of Formula (3) becomes a value within the preferable range. Moreover, according to test materials #30, #56, and #57, it became clear that the stability of the quality of the organic resin-coated plated steel sheet 10 is lowered in a case where the value of Formula (3) exceeds 50. The same result was obtained even if Formula (3) was substituted with Formula (3') for verification.

TABLE 1

| | | | Contents (unit) | #1 Example (reference conditions) | #2 Comparative Example | #3 Example | #4 Example | #5 Comparative Example |
|---|---|---|---|---|---|---|---|---|
| Organic resin coating | Resin | Melamine-formaldehyde | Amount (mass %) | 26 | 26 | 26 | 26 | 26 |
| | | Polyester | Amount (mass %) | 74 | 74 | 74 | 74 | 74 |
| | | | Glass transition temperature Tgp (° C.) | 6 | −30 | 0 | 20 | 50 |
| | | Crosslinking reaction product | Presence or absence | Present | Present | Present | Present | Present |
| | | Epoxy resin | Amount (mass %) | — | — | — | — | — |
| | Pigment | Carbon black | Amount (mass %) | — | — | — | — | — |
| | | Calcium-modified silica | Amount (mass %) | — | — | — | — | — |
| | Beads | | Amount (mass % with respect to resin solid content) | 3 | 3 | 3 | 3 | 3 |
| | | | Glass transition temperature Tgb (° C.) | −13 | −13 | −13 | −13 | −13 |
| | | | Dispersion degree (pieces/mm$^2$) | 400 | 400 | 400 | 400 | 400 |
| | | | Average particle size φ (μm) | 20 | 20 | 20 | 20 | 20 |
| | | | Kind of beads | Urethane | Urethane | Urethane | Urethane | Urethane |
| | Average film thickness of parts where beads are not present T (μm) | | | 10 | 10 | 10 | 10 | 10 |
| | Average film thickness of parts of bead coating t (μm) | | | 0.8 | 0.8 | 0.8 | 0.8 | 0.8 |
| | φ/T | | | 2 | 2 | 2 | 2 | 2 |
| | Glass transition temperature of organic resin coating Tgf (° C.) | | | 15 | −17 | 10 | 29 | 54 |
| | (φ/t) × {(Tgb + 273)/(Tgf + 273)} | | | 22.6 | 25.4 | 23.0 | 21.5 | 19.9 |
| | (φ/t) × {(Tgb + 273)/(Tgp + 273)} | | | 26.8 | 23.4 | 26.3 | 28.2 | 31.1 |
| Chemical treatment layer | | | Presence or absence | Absent | Absent | Absent | Absent | Absent |
| Plating | | | Kind | EG | EG | EG | EG | EG |
| | | | Adhesion amount (g/m$^2$) | 20 | 20 | 20 | 20 | 20 |
| Manufacturing method | | | Surface tension of paint (mN/m) | 30 | 30 | 30 | 30 | 30 |
| | | | Viscosity of paint (mPa · s) | 500 | 500 | 500 | 500 | 500 |
| | | | Surface tension of beads (mN/m) | 90 | 90 | 90 | 90 | 90 |
| Performance evaluation | | | Restoration time of beads [hr] | 3 | 0.5 | 2 | 4 | 7 |
| | | | Degreasing properties | 5 | 2 | 5 | 5 | 5 |
| | | | Defect resistance | 5 | 3 | 4 | 5 | 3 |
| | | | Workability | 5 | 5 | 5 | 5 | 2 |
| | | | Working adhesion | 4 | 4 | 4 | 4 | 4 |
| | | | Corrosion resistance | 4 | 4 | 4 | 4 | 4 |
| | | | Stability of paint with time | ○ | ○ | ○ | ○ | ○ |

| | | | Contents (unit) | #6 Comparative Example | #7 Example | #8 Example | #9 Comparative Example | #10 Comparative Example |
|---|---|---|---|---|---|---|---|---|
| Organic resin coating | Resin | Melamine-formaldehyde | Amount (mass %) | 26 | 26 | 26 | 26 | 26 |
| | | Polyester | Amount (mass %) | 74 | 74 | 74 | 74 | 74 |
| | | | Glass transition temperature Tgp (° C.) | 6 | 6 | 6 | 6 | 6 |
| | | Crosslinking reaction product | Presence or absence | Present | Present | Present | Present | Present |
| | | Epoxy resin | Amount (mass %) | — | — | — | — | — |
| | Pigment | Carbon black | Amount (mass %) | — | — | — | — | — |
| | | Calcium-modified silica | Amount (mass %) | — | — | — | — | — |
| | Beads | | Amount (mass % with respect to | 0.5 | 8 | 15 | 20 | 6 |

TABLE 1-continued

|  |  |  | | | | | |
|---|---|---|---|---|---|---|---|
| | | resin solid content) | | | | | |
| | | Glass transition temperature Tgb (° C.) | −13 | −13 | −13 | −13 | <u>−65</u> |
| | | Dispersion degree (pieces/mm²) | 400 | 400 | 400 | 400 | 400 |
| | | Average particle size φ (μm) | 20 | 20 | 20 | 20 | 20 |
| | | Kind of beads | Urethane | Urethane | Urethane | Urethane | Urethane |
| | Average film thickness of parts where beads are not present T (μm) | | 10 | 10 | 10 | 10 | 10 |
| | Average film thickness of parts of bead coating t (μm) | | 0.8 | 0.8 | 0.8 | 0.8 | 0.8 |
| | φ/T | | 2 | 2 | 2 | 2 | 2 |
| | Glass transition temperature of organic resin coating Tgf (° C.) | | 15 | 15 | 15 | 15 | 15 |
| | (φ/t) × {(Tgb + 273)/(Tgf + 273)} | | 22.6 | 22.6 | 22.6 | 22.6 | 18.1 |
| | (φ/t) × {(Tgb + 273)/(Tgp + 273)} | | 26.8 | 26.8 | 26.8 | 26.8 | 33.5 |
| Chemical treatment layer | Presence or absence | | Absent | Absent | Absent | Absent | Absent |
| Plating | Kind | | EG | EG | EG | EG | EG |
| | Adhesion amount (g/m²) | | 20 | 20 | 20 | 20 | 20 |
| Manufacturing method | Surface tension of paint (mN/m) | | 30 | 30 | 30 | 30 | 30 |
| | Viscosity of paint (mPa · s) | | 500 | 500 | 500 | 500 | 500 |
| | Surface tension of beads (mN/m) | | 90 | 90 | 90 | 90 | 90 |
| Performance evaluation | Restoration time of beads [hr] | | 3 | 3 | 3 | 3 | <u>0.7</u> |
| | Degreasing properties | | 5 | 5 | 5 | 5 | <u>2</u> |
| | Defect resistance | | <u>1</u> | 5 | 5 | 5 | 5 |
| | Workability | | 5 | 5 | 5 | 3 | 5 |
| | Working adhesion | | 4 | 4 | 4 | 4 | 4 |
| | Corrosion resistance | | 4 | 4 | 4 | <u>2</u> | 4 |
| | Stability of paint with time | | ◯ | ◯ | ◯ | ◯ | <u>X</u> |

TABLE 2

| | | | Contents (unit) | #11 Example | #12 Example | #13 Comparative Example | #14 Comparative Example | #15 Example | #16 Example |
|---|---|---|---|---|---|---|---|---|---|
| Organic resin coating | Resin | Melamine-formaldehyde | Amount (mass %) | 26 | 26 | 26 | 26 | 26 | 26 |
| | | Polyester | Amount (mass %) | 74 | 74 | 74 | 74 | 74 | 74 |
| | | | Glass transition temperature Tgp (° C.) | 6 | 6 | 6 | 6 | 6 | 6 |
| | | Crosslinking reaction product | Presence or absence | Present | Present | Present | Present | Present | Present |
| | | Epoxy resin | Amount (mass %) | — | — | — | — | — | — |
| | Pigment | Carbon black | Amount (mass %) | — | — | — | — | — | — |
| | | Calcium-modified silica | Amount (mass %) | — | — | — | — | — | — |
| | Beads | | Amount (mass % with respect to resin solid content) | 6 | 6 | 6 | 6 | 1.5 | 5.3 |
| | | | Glass transition temperature Tgb (° C.) | −55 | 34 | <u>55</u> | −13 | −13 | −13 |
| | | | Dispersion degree (pieces/mm²) | 400 | 400 | 400 | <u>2</u> | 200 | 700 |
| | | | Average particle size φ (μm) | 20 | 20 | 20 | 20 | 20 | 20 |
| | | | Kind of beads | Urethane | Urethane | Urethane | Urethane | Urethane | Urethane |
| | Average film thickness of parts where beads are not present T (μm) | | | 10 | 10 | 10 | 10 | 10 | 10 |
| | Average film thickness of parts of bead coating t (μm) | | | 0.8 | 0.8 | 0.8 | 0.8 | 0.8 | 0.8 |
| | φ/T | | | 2 | 2 | 2 | 2 | 2 | 2 |
| | Glass transition temperature of organic resin coating Tgf (° C.) | | | 15 | 15 | 15 | 15 | 15 | 15 |
| | (φ/t) × {(Tgb + 273)/(Tgf + 273)} | | | 18.9 | 26.6 | 28.5 | 22.6 | 22.6 | 22.6 |
| | (φ/t) × {(Tgb + 273)/(Tgp + 273)} | | | 32.0 | 22.7 | 21.3 | 26.8 | 26.8 | 26.8 |
| Chemical treatment layer | Presence or absence | | | Absent | Absent | Absent | Absent | Absent | Absent |
| Plating | Kind | | | EG | EG | EG | EG | EG | EG |
| | Adhesion amount (g/m²) | | | 20 | 20 | 20 | 20 | 20 | 20 |
| Manufacturing method | Surface tension of paint (mN/m) | | | 30 | 30 | 30 | 30 | 30 | 30 |
| | Viscosity of paint (mPa · s) | | | 500 | 500 | 500 | 500 | 500 | 500 |
| | Surface tension of beads (mN/m) | | | 90 | 90 | 90 | 90 | 90 | 90 |
| Performance | Restoration time of beads [hr] | | | 1.1 | 5 | <u>24</u> | 3 | 3 | 3 |

TABLE 2-continued

| | | | #17 Comparative Example | #18 Comparative Example | #19 Comparative Example | #20 Comparative Example |
|---|---|---|---|---|---|---|
| evaluation | Degreasing properties | | 4 | 5 | 5 | 5 | 5 | 5 |
| | Defect resistance | | 5 | 5 | 2 | 1 | 5 | 5 |
| | Workability | | 5 | 5 | 5 | 5 | 5 | 5 |
| | Working adhesion | | 4 | 4 | 4 | 4 | 4 | 4 |
| | Corrosion resistance | | 4 | 4 | 4 | 4 | 4 | 4 |
| | Stability of paint with time | | ○ | ○ | ○ | ○ | ○ | ○ |

| | | Contents (unit) | #17 Comparative Example | #18 Comparative Example | #19 Comparative Example | #20 Comparative Example |
|---|---|---|---|---|---|---|
| Organic resin coating | Resin | Melamine-formaldehyde Amount (mass %) | 26 | 26 | 26 | 26 |
| | | Polyester Amount (mass %) | 74 | 74 | 74 | 74 |
| | | Glass transition temperature Tgp (° C.) | 6 | 6 | 6 | 6 |
| | | Crosslinking reaction product Presence or absence | Present | Present | Present | Present |
| | | Epoxy resin Amount (mass %) | — | — | — | — |
| | Pigment | Carbon black Amount (mass %) | — | — | — | — |
| | | Calcium-modified silica Amount (mass %) | — | — | — | — |
| | Beads | Amount (mass % with respect to resin solid content) | 9 | 9 | 9 | 9 |
| | | Glass transition temperature Tgb (° C.) | −13 | 90 | 40 | −13 |
| | | Dispersion degree (pieces/mm²) | 1200 | 400 | 400 | 400 |
| | | Average particle size φ (μm) | 20 | 20 | 20 | 20 |
| | | Kind of beads | Urethane | Acrylic | Nylon | Urethane |
| | Average film thickness of parts where beads are not present T (μm) | | 10 | 10 | 10 | 4 |
| | Average film thickness of parts of bead coating t (μm) | | 0.8 | 0.8 | 0.8 | 0.32 |
| | φ/T | | 2 | 2 | 2 | 5 |
| | Glass transition temperature of organic resin coating Tgf (° C.) | | 15 | 15 | 15 | 15 |
| | (φ/t) × {(Tgb + 273)/(Tgf + 273)} | | 22.6 | 31.5 | 27.2 | 56.4 |
| | (φ/t) × {(Tgb + 273)/(Tgp + 273)} | | 26.8 | 19.2 | 22.3 | 67.1 |
| Chemical treatment layer | Presence or absence | | Absent | Absent | Absent | Absent |
| Plating | Kind | | EG | EG | EG | EG |
| | Adhesion amount (g/m²) | | 20 | 20 | 20 | 20 |
| Manufacturing method | Surface tension of paint (mN/m) | | 30 | 30 | 30 | 30 |
| | Viscosity of paint (mPa · s) | | 500 | 500 | 500 | 500 |
| | Surface tension of beads (mN/m) | | 90 | 70 | 75 | 90 |
| Performance evaluation | Restoration time of beads [hr] | | 3 | 72< | 72< | 3 |
| | Degreasing properties | | 5 | 5 | 5 | 5 |
| | Defect resistance | | 2 | 2 | 2 | 3 |
| | Workability | | 5 | 5 | 5 | 3 |
| | Working adhesion | | 4 | 4 | 4 | 4 |
| | Corrosion resistance | | 4 | 4 | 4 | 2 |
| | Stability of paint with time | | ○ | ○ | ○ | ○ |

TABLE 3

| | | Contents (unit) | #21 Example | #22 Example | #23 Comparative Example | #24 Comparative Example | #25 Example |
|---|---|---|---|---|---|---|---|
| Organic resin coating | Resin | Melamine-formaldehyde Amount (mass %) | 26 | 26 | 26 | 26 | 26 |
| | | Polyester Amount (mass %) | 74 | 74 | 74 | 74 | 74 |
| | | Glass transition temperature Tgp (° C.) | 6 | 6 | 6 | 6 | 6 |
| | | Crosslinking reaction product Presence or absence | Present | Present | Present | Present | Present |
| | | Epoxy resin Amount (mass %) | — | — | — | — | — |
| | Pigment | Carbon black Amount (mass %) | — | — | — | — | — |
| | | Calcium-modified silica Amount (mass %) | — | — | — | — | — |
| | Beads | Amount (mass % with respect to resin solid content) | 9 | 9 | 9 | 9 | 9 |
| | | Glass transition | −13 | −13 | −13 | −13 | −13 |

TABLE 3-continued

| | | | Contents (unit) | | | | | |
|---|---|---|---|---|---|---|---|---|
| | | | temperature Tgb (° C.) | | | | | |
| | | | Dispersion degree (pieces/mm²) | 400 | 400 | 400 | 400 | 400 |
| | | | Average particle size φ (μm) | 20 | 20 | 20 | 20 | 30 |
| | | | Kind of beads | Urethane | Urethane | Urethane | Urethane | Urethane |
| | | Average film thickness of parts where beads are not present T (μm) | | 5 | 15 | <u>18</u> | 20 | 5 |
| | | Average film thickness of parts of bead coating t (μm) | | 0.4 | 1.2 | 1.44 | 1.6 | 0.4 |
| | | φ/T | | 4 | 1.3 | 1.1 | <u>1.0</u> | 6.0 |
| | | Glass transition temperature of organic resin coating Tgf (° C.) | | 15 | 15 | 15 | 15 | 15 |
| | | (φ/t) × {(Tgb + 273)/(Tgf + 273)} | | 45.1 | 15.0 | 12.5 | 11.3 | 67.7 |
| | | (φ/t) × {(Tgb + 273)/(Tgp + 273)} | | 53.7 | 17.9 | 14.9 | 13.4 | 80.5 |
| Chemical treatment layer | | | Presence or absence | Absent | Absent | Absent | Absent | Absent |
| Plating | | | Kind | EG | EG | EG | EG | EG |
| | | | Adhesion amount (g/m²) | 20 | 20 | 20 | 20 | 20 |
| Manufacturing method | Surface tension of paint (mN/m) | | | 30 | 30 | 30 | 30 | 30 |
| | Viscosity of paint (mPa · s) | | | 500 | 500 | 500 | 500 | 500 |
| | Surface tension of beads (mN/m) | | | 90 | 90 | 90 | 90 | 90 |
| Performance evaluation | Restoration time of beads [hr] | | | 3 | 3 | 3 | 3 | 2 |
| | Degreasing properties | | | 5 | 5 | 5 | 5 | 4 |
| | Defect resistance | | | 3 | 3 | 3 | <u>2</u> | 5 |
| | Workability | | | 3 | 3 | 3 | 3 | 4 |
| | Working adhesion | | | 4 | 4 | 4 | 4 | 4 |
| | Corrosion resistance | | | 4 | 4 | 4 | 4 | 4 |
| | Stability of paint with time | | | ○ | ○ | ○ | ○ | ○ |

| | | | Contents (unit) | #26 Example | #27 Comparative Example | #28 Comparative Example | #29 Example | #30 Example |
|---|---|---|---|---|---|---|---|---|
| Organic resin coating | Resin | Melamine-formaldehyde | Amount (mass %) | 26 | 26 | 26 | 26 | 26 |
| | | Polyester | Amount (mass %) | 74 | 74 | 74 | 74 | 74 |
| | | | Glass transition temperature Tgp (° C.) | 6 | 6 | 6 | 6 | 6 |
| | | Crosslinking reaction product | Presence or absence | Present | Present | Present | Present | Present |
| | | Epoxy resin | Amount (mass %) | — | — | — | — | — |
| | Pigment | Carbon black | Amount (mass %) | — | — | — | — | — |
| | | Calcium-modified silica | Amount (mass %) | — | — | — | — | — |
| | Beads | | Amount (mass % with respect to resin solid content) | 9 | 9 | 9 | 9 | 9 |
| | | | Glass transition temperature Tgb (° C.) | −13 | −13 | −34 | −34 | 34 |
| | | | Dispersion degree (pieces/mm²) | 400 | 400 | 400 | 400 | 400 |
| | | | Average particle size φ (μm) | 50 | 60 | 6 | 15 | 40 |
| | | | Kind of beads | Urethane | Urethane | Urethane | Urethane | Urethane |
| | | Average film thickness of parts where beads are not present T (μm) | | 5 | 5 | 5 | 10 | 5 |
| | | Average film thickness of parts of bead coating t (μm) | | 0.4 | 0.4 | 0.6 | 0.8 | 0.4 |
| | | φ/T | | 10.0 | <u>12.0</u> | 1.2 | 1.5 | 8 |
| | | Glass transition temperature of organic resin coating Tgf (° C.) | | 15 | 15 | 15 | 15 | 15 |
| | | (φ/t) × {(Tgb + 273)/(Tgf + 273)} | | 112.8 | 135.4 | 8.3 | 15.6 | 106.6 |
| | | (φ/t) × {(Tgb + 273)/(Tgp + 273)} | | 134.1 | 161.0 | 11.7 | 21.9 | 90.9 |
| Chemical treatment layer | | | Presence or absence | Absent | Absent | Absent | Absent | Absent |
| Plating | | | Kind | EG | EG | EG | EG | EG |
| | | | Adhesion amount (g/m²) | 20 | 20 | 20 | 20 | 20 |
| Manufacturing method | Surface tension of paint (mN/m) | | | 30 | 30 | 30 | 30 | 30 |
| | Viscosity of paint (mPa · s) | | | 500 | 500 | 900 | 500 | 500 |
| | Surface tension of beads (mN/m) | | | 90 | 90 | 90 | 90 | 90 |
| Performance evaluation | Restoration time of beads [hr] | | | 1.5 | <u>0.9</u> | <u>8</u> | 4 | 1.2 |
| | Degreasing properties | | | 3 | <u>2</u> | 5 | 5 | 5 |
| | Defect resistance | | | 5 | 5 | <u>2</u> | 5 | 5 |
| | Workability | | | 4 | <u>1</u> | 4 | 4 | 4 |
| | Working adhesion | | | 4 | 4 | 4 | 4 | 4 |
| | Corrosion resistance | | | 3 | 3 | 3 | 3 | 3 |
| | Stability of paint with time | | | ○ | ○ | ○ | ○ | ○ |

TABLE 4

| | | Contents (unit) | #31 Comparative Example | #32 Example | #33 Example | #34 Example | #35 Example |
|---|---|---|---|---|---|---|---|
| Organic resin coating | Resin | Melamine-formaldehyde Amount (mass %) | 26 | 26 | 26 | 26 | 26 |
| | | Polyester Amount (mass %) | 74 | 74 | 74 | 74 | 74 |
| | | Glass transition temperature Tgp (° C.) | 6 | 6 | 6 | 6 | 6 |
| | | Crosslinking reaction product Presence or absence | Present | Present | Present | Present | Present |
| | | Epoxy resin Amount (mass %) | — | 0.3 | 1 | 6 | 7 |
| | Pigment | Carbon black Amount (mass %) | — | — | — | — | — |
| | | Calcium-modified silica Amount (mass %) | — | — | — | — | — |
| | Beads | Amount (mass % with respect to resin solid content) | 9 | 9 | 9 | 9 | 9 |
| | | Glass transition temperature Tgb (° C.) | −13 | −13 | −13 | −13 | −13 |
| | | Dispersion degree (pieces/mm$^2$) | 400 | 400 | 400 | 400 | 400 |
| | | Average particle size φ (μm) | 80 | 20 | 20 | 20 | 20 |
| | | Kind of beads | Urethane | Urethane | Urethane | Urethane | Urethane |
| | | Average film thickness of parts where beads are not present T (μm) | 5 | 10 | 10 | 10 | 10 |
| | | Average film thickness of parts of bead coating t (μm) | 0.4 | 0.8 | 0.8 | 0.8 | 0.8 |
| | | φ/T | 16 | 2 | 2 | 2 | 2 |
| | | Glass transition temperature of organic resin coating Tgf (° C.) | 15 | 15 | 15 | 15 | 15 |
| | | (φ/t) × {(Tgb + 273)/(Tgf + 273)} | 180.6 | 22.6 | 22.6 | 22.6 | 22.6 |
| | | (φ/t) × {(Tgb + 273)/(Tgp + 273)} | 214.6 | 26.8 | 26.8 | 26.8 | 26.8 |
| Chemical treatment layer | | Presence or absence | Absent | Absent | Absent | Absent | Absent |
| Plating | | Kind | EG | EG | EG | EG | EG |
| | | Adhesion amount (g/m$^2$) | 20 | 20 | 20 | 20 | 20 |
| Manufacturing method | | Surface tension of paint (mN/m) | 30 | 30 | 30 | 30 | 30 |
| | | Viscosity of paint (mPa · s) | 500 | 500 | 500 | 500 | 500 |
| | | Surface tension of beads (mN/m) | 90 | 90 | 90 | 90 | 90 |
| Performance evaluation | | Restoration time of beads [hr] | 0.2 | 1.2 | 1.2 | 1.2 | 1.2 |
| | | Degreasing properties | 1 | 5 | 5 | 5 | 5 |
| | | Defect resistance | 5 | 5 | 5 | 5 | 5 |
| | | Workability | 4 | 4 | 4 | 4 | 3 |
| | | Working adhesion | 4 | 3 | 5 | 5 | 5 |
| | | Corrosion resistance | 3 | 3 | 3 | 4 | 4 |
| | | Stability of paint with time | ○ | ○ | ○ | ○ | ○ |

| | | Contents (unit) | #36 Example | #37 Example | #38 Example | #39 Example | #40 Example |
|---|---|---|---|---|---|---|---|
| Organic resin coating | Resin | Melamine-formaldehyde Amount (mass %) | 26 | 26 | 26 | 26 | 26 |
| | | Polyester Amount (mass %) | 74 | 74 | 74 | 74 | 74 |
| | | Glass transition temperature Tgp (° C.) | 6 | 6 | 6 | 6 | 6 |
| | | Crosslinking reaction product Presence or absence | Present | Present | Present | Present | Present |
| | | Epoxy resin Amount (mass %) | — | — | — | — | — |
| | Pigment | Carbon black Amount (mass %) | 2 | 6 | 15 | 18 | — |
| | | Calcium-modified silica Amount (mass %) | — | — | — | — | 0.5 |
| | Beads | Amount (mass % with respect to resin solid content) | 9 | 9 | 9 | 9 | 9 |
| | | Glass transition temperature Tgb (° C.) | −13 | −13 | −13 | −13 | −13 |
| | | Dispersion degree (pieces/mm$^2$) | 400 | 400 | 400 | 400 | 400 |
| | | Average particle size φ (μm) | 20 | 20 | 20 | 20 | 20 |
| | | Kind of beads | Urethane | Urethane | Urethane | Urethane | Urethane |
| | | Average film thickness of parts where beads are not present T (μm) | 5 | 5 | 5 | 5 | 10 |
| | | Average film thickness of parts of bead coating t (μm) | 0.4 | 0.4 | 0.4 | 0.4 | 0.8 |
| | | φ/T | 4 | 4 | 4 | 4 | 2 |
| | | Glass transition temperature of organic resin coating Tgf (° C.) | 15 | 15 | 15 | 15 | 15 |
| | | (φ/t) × {(Tgb + 273)/(Tgf + 273)} | 45.1 | 45.1 | 45.1 | 45.1 | 22.6 |

TABLE 4-continued

|  |  |  | | | | | |
|---|---|---|---|---|---|---|---|
|  | ($\varphi$/t) × {(Tgb + 273)/(Tgp + 273)} | | 53.7 | 53.7 | 53.7 | 53.7 | 26.8 |
|  | Chemical treatment layer | Presence or absence | Absent | Absent | Absent | Absent | Absent |
|  | Plating | Kind | EG | EG | EG | EG | EG |
|  |  | Adhesion amount (g/m²) | 20 | 20 | 20 | 20 | 20 |
| Manufacturing method | Surface tension of paint (mN/m) | | 30 | 30 | 30 | 30 | 30 |
|  | Viscosity of paint (mPa·s) | | 500 | 500 | 500 | 500 | 500 |
|  | Surface tension of beads (mN/m) | | 90 | 90 | 90 | 90 | 90 |
| Performance evaluation | Restoration time of beads [hr] | | 3 | 3 | 3 | 3 | 3 |
|  | Degreasing properties | | 5 | 5 | 5 | 5 | 5 |
|  | Defect resistance | | 5 | 5 | 5 | 5 | 5 |
|  | Workability | | 5 | 5 | 5 | 5 | 5 |
|  | Working adhesion | | 5 | 5 | 5 | 5 | 5 |
|  | Corrosion resistance | | 4 | 4 | 3 | 3 | 3 |
|  | Stability of paint with time | | ○ | ○ | ○ | ○ | ○ |

TABLE 5

| | | | Contents (unit) | #41 Example | #42 Example | #43 Example | #44 Example | #45 Comparative Example | #46 Example |
|---|---|---|---|---|---|---|---|---|---|
| Organic resin coating | Resin | Melamine-formaldehyde | Amount (mass %) | 26 | 26 | 26 | 26 | 26 | 26 |
| | | Polyester | Amount (mass %) | 74 | 74 | 74 | 74 | 74 | 74 |
| | | | Glass transition temperature Tgp (° C.) | 6 | 6 | 6 | 6 | 6 | 6 |
| | | Crosslinking reaction product | Presence or absence | Present | Present | Present | Present | Present | Present |
| | | Epoxy resin | Amount (mass %) | — | — | — | — | — | — |
| | Pigment | Carbon black | Amount (mass %) | — | — | — | — | — | — |
| | | Calcium-modified silica | Amount (mass %) | 1 | 10 | 12 | — | — | — |
| | Beads | | Amount (mass % with respect to resin solid content) | 9 | 9 | 9 | 9 | 9 | 9 |
| | | | Glass transition temperature Tgb (° C.) | −13 | −13 | −13 | −13 | −13 | −13 |
| | | | Dispersion degree (pieces/mm²) | 400 | 400 | 400 | 400 | 400 | 400 |
| | | | Average particle size $\varphi$ (μm) | 20 | 20 | 20 | 20 | 20 | 20 |
| | | | Kind of beads | Urethane | Urethane | Urethane | Urethane | Urethane | Urethane |
| | Average film thickness of parts where beads are not present T (μm) | | | 10 | 10 | 10 | 10 | 10 | 10 |
| | Average film thickness of parts of bead coating t (μm) | | | 0.8 | 0.8 | 0.8 | 0.8 | 0.4 | 0.7 |
| | $\varphi$/T | | | 2 | 2 | 2 | 2 | 2 | 2 |
| | Glass transition temperature of organic resin coating Tgf (° C.) | | | 15 | 15 | 15 | 15 | 15 | 15 |
| | ($\varphi$/t) × {(Tgb + 273)/(Tgf + 273)} | | | 22.6 | 22.6 | 22.6 | 22.6 | 45.1 | 25.8 |
| | ($\varphi$/t) × {(Tgb + 273)/(Tgp + 273)} | | | 26.8 | 26.8 | 26.8 | 26.8 | 53.7 | 30.7 |
| Chemical treatment layer | | | Presence or absence | Absent | Absent | Absent | Present | Absent | Absent |
| Plating | | | Kind | EG | EG | EG | EG | EG | EG |
| | | | Adhesion amount (g/m²) | 20 | 20 | 20 | 20 | 20 | 20 |
| Manufacturing method | Surface tension of paint (mN/m) | | | 30 | 30 | 30 | 30 | 19 | 28 |
| | Viscosity of paint (mPa·s) | | | 500 | 500 | 500 | 500 | 500 | 500 |
| | Surface tension of beads (mN/m) | | | 90 | 90 | 90 | 90 | 90 | 90 |
| Performance evaluation | Restoration time of beads [hr] | | | 3 | 3 | 3 | 3 | 0.7 | 2 |
| | Degreasing properties | | | 5 | 5 | 5 | 5 | 2 | 4 |
| | Defect resistance | | | 5 | 5 | 5 | 5 | 5 | 5 |
| | Workability | | | 5 | 5 | 5 | 5 | 5 | 5 |
| | Working adhesion | | | 5 | 4 | 3 | 5 | 5 | 5 |
| | Corrosion resistance | | | 3 | 4 | 4 | 5 | 5 | 5 |
| | Stability of paint with time | | | ○ | ○ | ○ | ○ | ○ | ○ |

| | | | Contents (unit) | #47 Comparative Example | #48 Comparative Example | #49 Example | #50 Comparative Example | #51 Example | #52 Example |
|---|---|---|---|---|---|---|---|---|---|
| Organic resin coating | Resin | Melamine-formaldehyde | Amount (mass %) | 26 | 26 | 26 | 26 | 26 | 26 |
| | | Polyester | Amount (mass %) | 74 | 74 | 74 | 74 | 74 | 74 |
| | | | Glass transition temperature Tgp (° C.) | 6 | 6 | 6 | 6 | 6 | 6 |

TABLE 5-continued

|  |  |  |  |  |  |  |  |  |
|---|---|---|---|---|---|---|---|---|
|  |  | Crosslinking reaction product | Presence or absence | Present | Present | Present | Present | Present | Present |
|  |  | Epoxy resin | Amount (mass %) | — | — | — | — | — | — |
|  | Pigment | Carbon black | Amount (mass %) | — | — | — | — | — | — |
|  |  | Calcium-modified silica | Amount (mass %) | — | — | — | — | — | — |
|  | Beads |  | Amount (mass % with respect to resin solid content) | 9 | 9 | 9 | 9 | 9 | 9 |
|  |  |  | Glass transition temperature Tgb (° C.) | −13 | −13 | −13 | −13 | −13 | −13 |
|  |  |  | Dispersion degree (pieces/mm$^2$) | 400 | 400 | 400 | 400 | 400 | 400 |
|  |  |  | Average particle size φ (μm) | 20 | 20 | 20 | 20 | 20 | 20 |
|  |  |  | Kind of beads | Urethane | Urethane | Urethane | Urethane | Urethane | Urethane |
|  | Average film thickness of parts where beads are not present T (μm) |  |  | 10 | 10 | 10 | 10 | 10 | 10 |
|  | Average film thickness of parts of bead coating t (μm) |  |  | 1.5 | 0.5 | 1.1 | 1.5 | 0.7 | 0.4 |
|  | φ/T |  |  | 2 | 2 | 2 | 2 | 2 | 2 |
|  | Glass transition temperature of organic resin coating Tgf (° C.) |  |  | 15 | 15 | 15 | 15 | 15 | 15 |
|  | (φ/t) × {(Tgb + 273)/(Tgf + 273)} |  |  | 12.0 | 36.1 | 16.4 | 12.0 | 25.8 | 45.1 |
|  | (φ/t) × {(Tgb + 273)/(Tgp + 273)} |  |  | 14.3 | 42.9 | 19.5 | 14.3 | 30.7 | 53.7 |
| Chemical treatment layer |  | Presence or absence |  | Absent | Absent | Absent | Absent | Absent | Absent |
| Plating |  | Kind |  | EG | EG | EG | EG | EG | EG |
|  |  | Adhesion amount (g/m$^2$) |  | 20 | 20 | 20 | 20 | 20 | 20 |
| Manufacturing method | Surface tension of paint (mN/m) |  |  | <u>37</u> | 30 | 30 | 30 | 30 | 30 |
|  | Viscosity of paint (mPa · s) |  |  | 500 | <u>200</u> | 700 | <u>1200</u> | 500 | 500 |
|  | Surface tension of beads (mN/m) |  |  | 90 | 90 | 90 | 90 | 95 | <u>110</u> |
| Performance evaluation | Restoration time of beads [hr] |  |  | 8 | 0.9 | 4 | 8 | 2 | 1 |
|  | Degreasing properties |  |  | 5 | <u>2</u> | 5 | 5 | 4 | 3 |
|  | Defect resistance |  |  | <u>2</u> | 5 | 4 | <u>2</u> | 5 | 5 |
|  | Workability |  |  | 5 | 5 | 5 | 5 | 5 | 5 |
|  | Working adhesion |  |  | 5 | 5 | 5 | 5 | 5 | 5 |
|  | Corrosion resistance |  |  | 5 | 5 | 5 | 5 | 5 | 5 |
|  | Stability of paint with time |  |  | ○ | ○ | ○ | ○ | ○ | ○ |

TABLE 6

|  |  |  | Contents (unit) | #53 Example | #54 Example | #55 Example | #56 Example | #57 Example |
|---|---|---|---|---|---|---|---|---|
| Organic resin coating | Resin | Melamine-formaldehyde | Amount (mass %) | 26 | 26 | 26 | 26 | 26 |
|  |  | Polyester | Amount (mass %) | 74 | 74 | 74 | 74 | 74 |
|  |  |  | Glass transition temperature Tgp (° C.) | 6 | 6 | 20 | 6 | 6 |
|  |  | Crosslinking reaction product | Presence or absence | Present | Present | Present | Present | Present |
|  |  | Epoxy resin | Amount (mass %) | — | — | — | — | — |
|  | Pigment | Carbon black | Amount (mass %) | — | — | — | — | — |
|  |  | Calcium-modified silica | Amount (mass %) | — | — | — | — | — |
|  | Beads |  | Amount (mass % with respect to resin solid content) | 3 | 3 | 3 | 9 | 9 |
|  |  |  | Glass transition temperature Tgb (° C.) | −13 | −13 | 34 | 34 | 34 |
|  |  |  | Dispersion degree (pieces/mm$^2$) | 400 | 400 | 400 | 400 | 400 |
|  |  |  | Average particle size φ (μm) | 20 | 20 | 20 | 40 | 40 |
|  |  |  | Kind of beads | Urethane | Urethane | Urethane | Urethane | Urethane |
|  | Average film thickness of parts where beads are not present T (μm) |  |  | 10 | 10 | 10 | 5 | 5 |
|  | Average film thickness of parts of bead coating t (μm) |  |  | 0.3 | 0.6 | 0.4 | 0.4 | 0.4 |
|  | φ/T |  |  | 2 | 2 | 2 | 8 | 8 |
|  | Glass transition temperature of organic resin coating Tgf (° C.) |  |  | 15 | 15 | 29 | 15 | 15 |

TABLE 6-continued

| Contents (unit) | | | #53 Example | #54 Example | #55 Example | #56 Example | #57 Example |
|---|---|---|---|---|---|---|---|
| | $(\varphi/t) \times \{(Tgb + 273)/(Tgf + 273)\}$ | | 60.2 | 30.1 | 50.8 | 106.6 | 106.6 |
| | $(\varphi/t) \times \{(Tgb + 273)/(Tgp + 273)\}$ | | 71.5 | 35.8 | 47.7 | 90.9 | 90.9 |
| Chemical treatment layer | | Presence or absence | Absent | Absent | Absent | Absent | Absent |
| Plating | | Kind | EG | EG | EG | EG | EG |
| | | Adhesion amount (g/m²) | 20 | 20 | 20 | 20 | 20 |
| Manufacturing method | Surface tension of paint (mN/m) | | 30 | 30 | 30 | 30 | 30 |
| | Viscosity of paint (mPa · s) | | 300 | 420 | 300 | 500 | 500 |
| | Surface tension of beads (mN/m) | | 70 | 70 | 70 | 90 | 90 |
| Performance evaluation | Restoration time of beads [hr] | | 1.1 | 1.1 | 1.1 | 1.2 | 1.2 |
| | Degreasing properties | | 3 | 3 | 3 | 3 | 4 |
| | Defect resistance | | 5 | 5 | 5 | 5 | 5 |
| | Workability | | 5 | 5 | 5 | 4 | 4 |
| | Working adhesion | | 4 | 4 | 4 | 4 | 4 |
| | Corrosion resistance | | 4 | 4 | 4 | 3 | 3 |
| | Stability of paint with time | | ○ | ○ | ○ | ○ | ○ |

While the preferred embodiments of the present invention have been described above in detail with reference to the accompanying drawings, the present invention is not limited to these examples. It is obvious that those skilled in the art to which the present invention belongs can conceive of various changes or modifications within the scope of the technical idea described in the claims, and it is understood that these also fall within the technical scope of the present invention.

BRIEF DESCRIPTION OF THE REFERENCE SYMBOLS 10 organic resin-coated plated steel sheet
20 metal coated steel sheet
30 organic resin coating
31 part of bead coating
32 flat portion
40 bead
50 chemical treatment layer
60 pressing oil
70 degreasing agent

What is claimed is:

1. An organic resin-coated plated steel sheet comprising:
a metal coated steel sheet;
an organic resin coating covering the metal coated steel sheet; and
beads dispersed in the organic resin coating,
wherein the organic resin coating includes a polyester having a glass transition temperature of 0° C. to 20° C., and a melamine-formaldehyde,
the beads are urethane beads having a glass transition temperature of −60° C. to 50° C., are contained in the organic resin coating at a ratio of 1 to 15 mass % to the total mass of the organic resin coating, and are dispersed in the organic resin coating at an area density of 5 to 1000 pieces/mm², and
assuming that an average film thickness of a part where the beads are not present in the organic resin coating is T (μm), an average particle size of the beads is φ(μm), an average film thickness of parts of bead coating covering the beads in the organic resin coating is t (μm), the glass transition temperature of the polyester is Tgp (° C.), and the glass transition temperature of the beads is Tgb (° C.), relationships of Formulas (1) to (3) are satisfied, $5 \leq T \leq 15$ μm (1)

$1.1 \leq \varphi/T \leq 10$ (2)

$13 \leq (\varphi/t) \times \{(Tgb+273)/(Tgp+273)\} \leq 140$ (3).

2. The organic resin-coated plated steel sheet according to claim 1,
wherein the average film thickness of the parts of bead coating covering the beads in the organic resin coating is 0.3 to 1.0 μm.

3. The organic resin-coated plated steel sheet according to claim 1, further comprising:
a chemical treatment layer formed between the metal coated steel sheet and the organic resin coating.

4. The organic resin-coated plated steel sheet according to claim 1,
wherein the organic resin coating further includes at least one of 3 to 15 mass % of carbon black, 1 to 10 mass % of calcium-modified silica, and 0.5 to 5 mass % of an epoxy resin.

5. The organic resin-coated plated steel sheet according to claim 1,
wherein the metal coated steel sheet is a zinc based-metal coated steel sheet.

6. An organic resin-coated plated steel sheet comprising:
a metal coated steel sheet;
an organic resin coating covering the metal coated steel sheet; and
beads dispersed in the organic resin coating,
wherein the organic resin coating includes a polyester and a melamine-formaldehyde,
a glass transition temperature of the organic resin coating is 0° C. to 35° C.,
the beads are urethane beads having a glass transition temperature of −60° C. to 50° C., are contained in the organic resin coating at a ratio of 1 to 15 mass % to the total mass of the organic resin coating, and are dispersed in the organic resin coating at an area density of 5 to 1000 pieces/mm², and
assuming that an average film thickness of a part where the beads are not present in the organic resin coating is T (μm), an average particle size of the beads is φ(μm), an average film thickness of parts of bead coating covering the beads in the organic resin coating is t (μm), the glass transition temperature of the organic resin coating is Tgf (° C.), and the glass transition temperature of the beads is Tgb (° C.), relationships of Formulas (1) to (3') are satisfied, $5 \leq T \leq 15$ μm (1)

$$1.1 \leq \varphi/T \leq 10 \qquad (2)$$

$$10 \leq (\varphi/t) \times \{(Tgb+273)/(Tgf+273)\} \leq 115 \qquad (3').$$

* * * * *